(12) United States Patent
Wigren

(10) Patent No.: US 8,670,344 B2
(45) Date of Patent: Mar. 11, 2014

(54) METHODS AND ARRANGEMENTS FOR CELL STABILITY IN A CELLULAR COMMUNICATION SYSTEM

(75) Inventor: Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 113 days.

(21) Appl. No.: 13/306,593

(22) Filed: Nov. 29, 2011

(65) Prior Publication Data

US 2012/0140657 A1 Jun. 7, 2012

Related U.S. Application Data

(60) Provisional application No. 61/419,292, filed on Dec. 3, 2010.

(51) Int. Cl.
*H04J 1/16* (2006.01)
*H04L 12/56* (2011.01)

(52) U.S. Cl.
CPC ..................... *H04L 47/10* (2013.01)
USPC .......... 370/252; 370/341; 375/144; 455/67.13

(58) Field of Classification Search
USPC ................. 370/229–235, 241–252, 328–329, 370/338–341; 375/144, 147, 148, 260; 455/13.4, 63.1, 67.11, 67.13, 455/226.1–226.4
See application file for complete search history.

(56) References Cited

U.S. PATENT DOCUMENTS

| | | | |
|---|---|---|---|
| 2009/0262853 A1* | 10/2009 | Yoshida et al. | 375/267 |
| 2009/0270109 A1* | 10/2009 | Helmersson et al. | 455/453 |
| 2010/0197237 A1* | 8/2010 | Xu et al. | 455/67.11 |
| 2010/0226464 A1* | 9/2010 | Hua et al. | 375/346 |

FOREIGN PATENT DOCUMENTS

| | | |
|---|---|---|
| WO | 2008/039123 A1 | 4/2008 |
| WO | 2010/144004 A1 | 12/2010 |
| WO | 2011/031193 A1 | 3/2011 |
| WO | 2011/071428 A1 | 6/2011 |
| WO | 2011/155882 A1 | 12/2011 |

OTHER PUBLICATIONS

Wigren, T. et al. "Estimation of Uplink WCDMA Load in a Single RBS." 66th IEEE Vehicular Technology Conference, Sep. 30-Oct. 3, 2007.
Dahlman, E. et al. "Wider-Band 'Single-Carrier' Transmission." 3G Evolution, Second Edition: HSPA and LTE for Mobile Broadband, Elsevier Ltd., 2008, Chapter 5, p. 65.
Wigren, T. "Soft Uplink Load Estimation in WCDMA." IEEE Transactions on Vehicular Technology, vol. 58, No. 2, Feb. 2009.
Fulghum, T. et al. "Adaptive Generalized Rake Reception in DS-CDMA Systems." IEEE Transactions on Wireless Communications, vol. 8, No. 7, Jul. 2009.

* cited by examiner

*Primary Examiner* — Kan Yuen
(74) *Attorney, Agent, or Firm* — Murphy, Bilak & Homiller, PLLC

(57) ABSTRACT

A method for assisting load scheduling in a wireless communication system comprises computing of an estimate of a noise floor measure for received uplink radio signals and a neighbor cell interference power is estimated. An interference whitening of the received uplink radio signals is performed based on frequency domain equalizing or frequency domain pre-equalizing. A useful signal power after interference whitening is determined and a first user noise floor compensation factor is derived. A noise rise measure is calculated based at least on the useful signal power after interference whitening, the noise floor compensation factor, the noise floor measure and the estimated neighbor cell interference power.

21 Claims, 12 Drawing Sheets

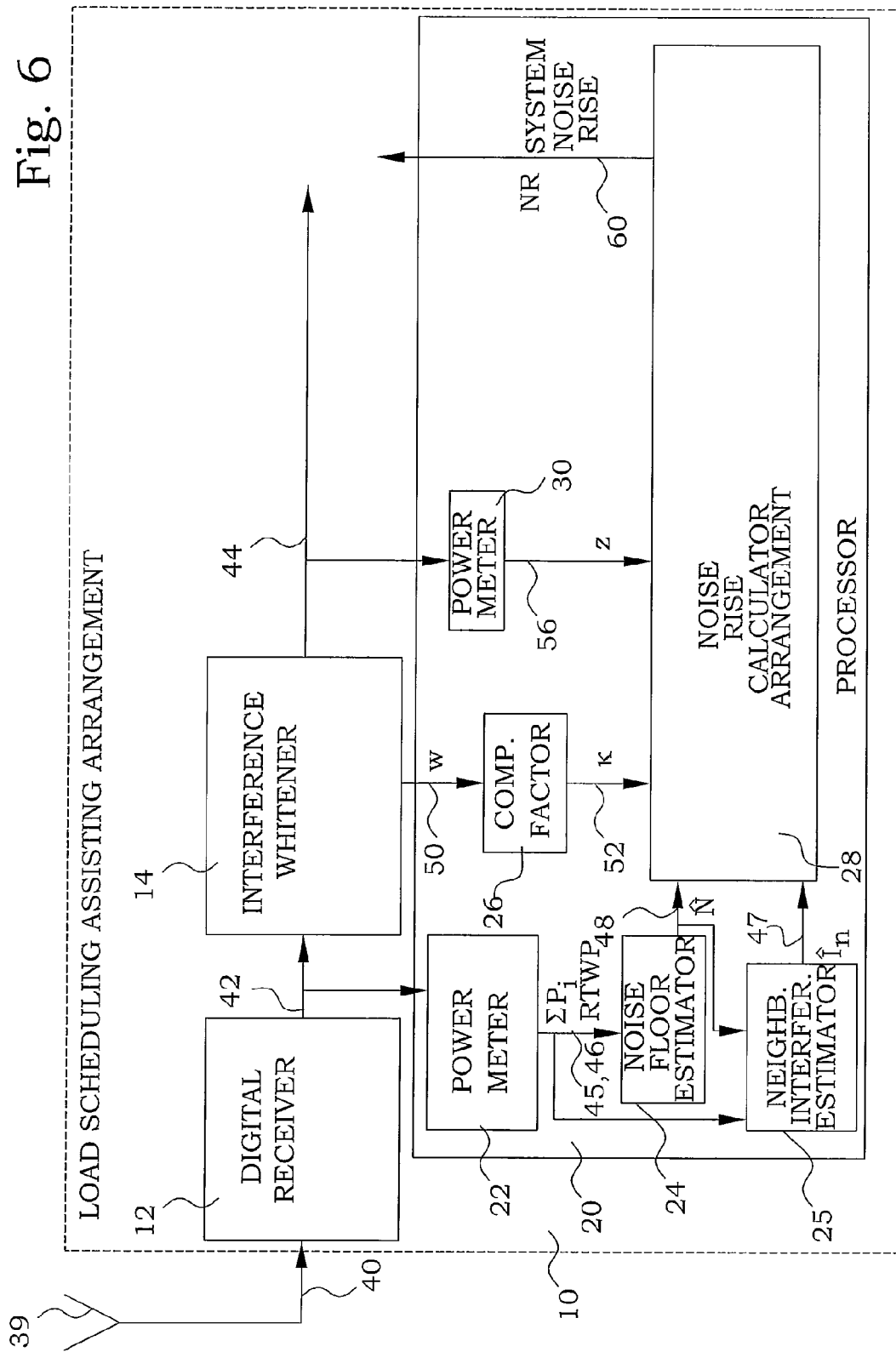

METHODS AND ARRANGEMENTS FOR CELL STABILITY IN A CELLULAR COMMUNICATION SYSTEM

RELATED APPLICATIONS

This application claims priority under 35 U.S.C. §119 to U.S. Provisional Application No. 61/419,292 filed Dec. 3, 2010.

TECHNICAL FIELD

The present invention relates in general to cell stability in cellular communication systems and in particular to cellular communication systems utilizing frequency domain receiver techniques.

BACKGROUND

Wideband Code Division Multiple Access (WCDMA) telecommunication systems have many attractive properties that can be used for future development of telecommunication services. In particular, the enhanced uplink of the WCDMA system is one ingredient in the mobile broadband solution of WCDMA. Now, in order to retain stability of a WCDMA cell, possibly in a cell running enhanced uplink, the load needs to be kept below a certain level. This follows since the majority of uplink user channels, at least in WCDMA, are subject to power control. This power control aims at keeping the received power level of each channel at a certain signal to interference ratio (SIR), in order to be able to meet specific service requirements.

Since the Radio Base Station (RBS) tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so called power rush, increases. It is thus a necessity to schedule high capacity uplink channels, like the enhanced uplink (EUL) channel in WCDMA, so that one can insure that instability is avoided. In order to do so, the momentary load must be estimated in the RBS or any node connected thereto. This enables the assessment of the capacity margin that is left to the instability point.

To handle increasing uplink data rates, interference suppression (IS) and interference cancellation (IC) are being introduced in WCDMA. The main result is a reduction in the interference experienced by a user. The IS and IC also affect the load measurement functionality of the WCDMA enhanced uplink (EUL).

The instantaneous uplink load without IS/IC is today preferably obtained by a dedicated algorithm which estimates the rise over thermal (RoT), from measurements of the received total wideband power (RTWP) [1], [2]. There is also an uplink (UL) receiver structure concept defined that is a combination of the G-rake+ receiver and traditional interference cancellation (SIC) [3].

Prior art methods for estimating load without IC, RoT estimation algorithms without IS/IC and IC methods with regeneration and subtraction are discussed more in detail in Appendix A.

There are a number of IS/IC methods available in prior art. Frequency domain equalization (FDE) and Frequency domain pre-equalization (FDPE) are two examples, where the interference is handled in the frequency domain, i.e. they are frequency domain receiver techniques.

Minimum mean square error (MMSE) FDE is a common technique to combat frequency selectivity in wideband channels, like in the WCDMA uplink. FDE can be seen as providing a counterpart to the G-rake receiver. The main advantages, as compared to time domain equalization, include a reduced complexity. FDE primarily provides (self-)interference suppression FDPE is another frequency domain technique for interference suppression that has been developed as an alternative to the G-rake+ receiver structure. The main advantages associated with FDPE as compared to G-rake+ are claimed to be a lower complexity, a simpler receiver structure where much can be reduced and algorithms that may re-use LTE ASIC accelerators for fast Fourier transforms. At the same time, most of the interference suppression gains associated with the G-rake+ receiver remain.

An overview of these techniques is given in Appendix B.

The prior art cell stability load estimation functionality, exploits load factors for each user. In their simplest form the load factors are given by:

$$L_u = \frac{P_u}{RTWP} = \frac{(C/I)_u}{1+(C/I)_u}, u = 1, \ldots, U,$$

where $P_u$ is the power of user u. Load factors are then summed up, for each power controlled user. In this way the neighbor cell interference is not included in the resulting load measure. This is reasonable since the neighbor cell interference should not affect the own cell power control loop, at least not when first order effects are considered.

However, using prior art solutions of [1], [2] for load estimation, the scheduler will experience the load before IS or IC, e.g. according to FDE or FDPE, is applied. Hence the scheduling performance will then be the same as without IS or IC, i.e. under-scheduling and under-utilization will result.

A problem with existing load estimation algorithms compatible with the FDE and FDPE receiver structures, known in public prior art, is that they overestimate the air-interface load of the uplink, relevant for cell stability. Thereby they cause under-scheduling in the RBS, which results in a too low throughput and/or capacity. They also cause blocking in the admission control function in the RNC, which also results in reduced throughput/capacity. Another problem is also that the admission and congestion control algorithms that reside in the RNC are not able to admit users so that the uplink with IS/IC is fully exploited.

SUMMARY

A general object of several embodiments of the present invention is to provide solutions to one or more of the above problems. A further object of some embodiments of the present invention is to achieve noise rise measures and load estimations that are relevant for uplink cell stability, after the interference suppression step.

In a first aspect, a method for assisting load scheduling in a wireless communication system comprises computing of an estimate of a noise floor measure for received uplink radio signals and a neighbor cell interference power is estimated. An interference whitening of the received uplink radio signals is performed based on frequency domain equalizing or frequency domain pre-equalizing. A useful signal power after interference whitening is determined and a first user noise floor compensation factor is derived. A noise rise measure is calculated based at least on the useful signal power after interference whitening, the noise floor compensation factor, the noise floor measure and the estimated neighbor cell interference power.

In a second aspect, an arrangement for assisting load scheduling in a wireless communication system comprises a digital receiver, an interference whitener and a processor. The interference whitener is connected to the digital receiver. The interference whitener is based on frequency domain equalizing or frequency domain pre-equalizing. The processor is connected to the digital receiver and to an output from the interference whitener. The processor is configured for computing an estimate of a noise floor measure and for estimating a neighbor cell interference power. The processor is further configured for determining a useful signal power after interference whitening and for deriving a first user noise floor compensation factor. The processor is also configured for calculating a noise rise measure based at least on the useful signal power after interference whitening, the noise floor compensation factor, the noise floor measure and the estimated neighbor cell interference power.

In a third aspect, a base station of a wireless communication system comprises an arrangement for assisting load scheduling. The arrangement for assisting load scheduling in turn comprises a digital receiver, an interference whitener and a processor. The interference whitener is connected to the digital receiver. The interference whitener is based on frequency domain equalizing or frequency domain pre-equalizing. The processor is connected to the digital receiver and to an output from the interference whitener. The processor is configured for computing an estimate of a noise floor measure and for estimating a neighbor cell interference power. The processor is further configured for determining a useful signal power after interference whitening and for deriving a first user noise floor compensation factor. The processor is also configured for calculating a noise rise measure based at least on the useful signal power after interference whitening, the noise floor compensation factor, the noise floor measure and the estimated neighbor cell interference power.

There are several advantages of some embodiments of the invention. One advantage is that the presently disclosed techniques allow for load estimation, addressing the uplink cell stability together with the IS gains of FDE and FDPE, thus enhancing coverage, capacity and cell throughput at system level. Without the disclosed invention, large parts of the gains associated with FDE and FDPE would not materialize, due to the need to use too conservative margins.

Another advantage is that the presently disclosed techniques allow the cell stability load measures to be computed from the RoT after FDE or FDPE processing, and other quantities, e.g. neighbor cell interference and the thermal noise power floor that can be estimated before such FDE or FDPE processing. This minimizes ASIC impacts.

Furthermore, this also allow the load estimation and scheduling principles of existing EUL implementation to be kept relatively unchanged, when the FDE or FDPE receiver structure is to be introduced. This follows since the present system requires load measures that quantify RoT as well as a noise rise related to uplink cell stability.

A further advantage is that the present principles have low computational complexities.

Further advantages are described in connection with the detailed description here below.

BRIEF DESCRIPTION OF THE DRAWINGS

The invention, together with further objects and advantages thereof, may best be understood by making reference to the following description taken together with the accompanying drawings, in which:

FIG. 6 is a block scheme of an embodiment of a load scheduling assisting arrangement according to the present invention;

DETAILED DESCRIPTION

Throughout the entire disclosure, bold letters in equations refer to vector or matrix quantities.

Throughout the drawings, the same reference numbers are used for similar or corresponding elements.

In order to be able to admit users so that the uplink after application of IS/IC with a FDE or FDPE receiver is fully exploited, there is a need for the admission and congestion control algorithms that reside in the RNC to know the load after all gains have materialized. In other words, there is a need for load estimation after IS/IC with the FDE/FDPE receiver. The scheduler must be aware of the instantaneous uplink load in several signal points after IS or IC have been applied. Unless such load estimates are made available it will not be possible to exploit the link gains associated with IS or IC fully, e.g. when scheduling EUL users.

The present document discloses new algorithms and measures for load estimation that reflects the additional (self) IS gain of the FDE, or additional IS gain of the FDPE receiver structure. The new load measures and algorithms aim at complementing rise over thermal load measures by addressing cell stability directly. Further, the present document discloses means to compute neighbor cell interference after FDE and FDPE processing, and to combine the neighbor cell interference with a RoT measure and a noise power floor, thereby obtaining said new load measures addressing cell stability directly.

Figure 1:
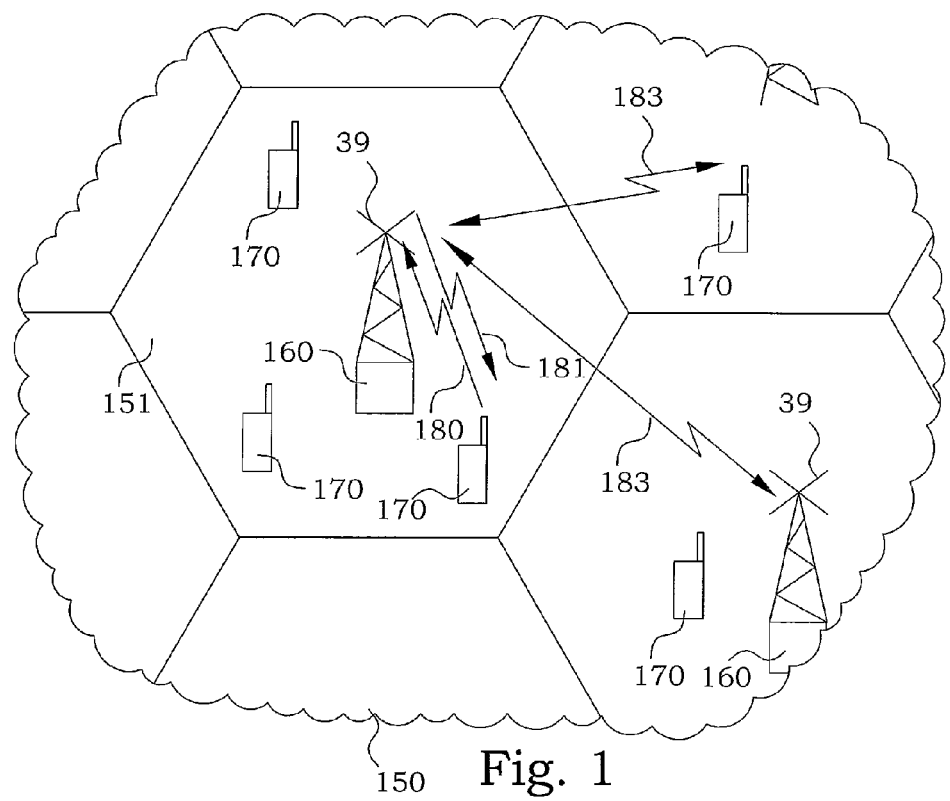
FIG. 1 is a schematic illustration of a wireless communication system.

The present invention relates to arrangements and methods in wireless communication systems. FIG. 1 illustrates a schematic view of an embodiment of such a wireless communication system 150. A radio base station (RBS) 160 communicates via its antenna/antennas 39 with a multitude of user equipments (UE) 170 situated within a cell 151 of the wireless communication system 150. Radio signals transmitted from the RBS 160 to the UEs 170 are denoted as downlink signals 181, and radio signals transmitted from the UEs 170 to the RBS 160 are denoted as uplink signals 180. This invention mainly considers the uplink signals, whereby arrangements for noise rise estimation typically are provided in the RBS 160. Besides the intentional uplink signals 180, the RBS 160 also receives interfering signals 183.

In order to have some detailed background, noise rise estimation without FDE or FDPE is first schematically described.

Figure 2:
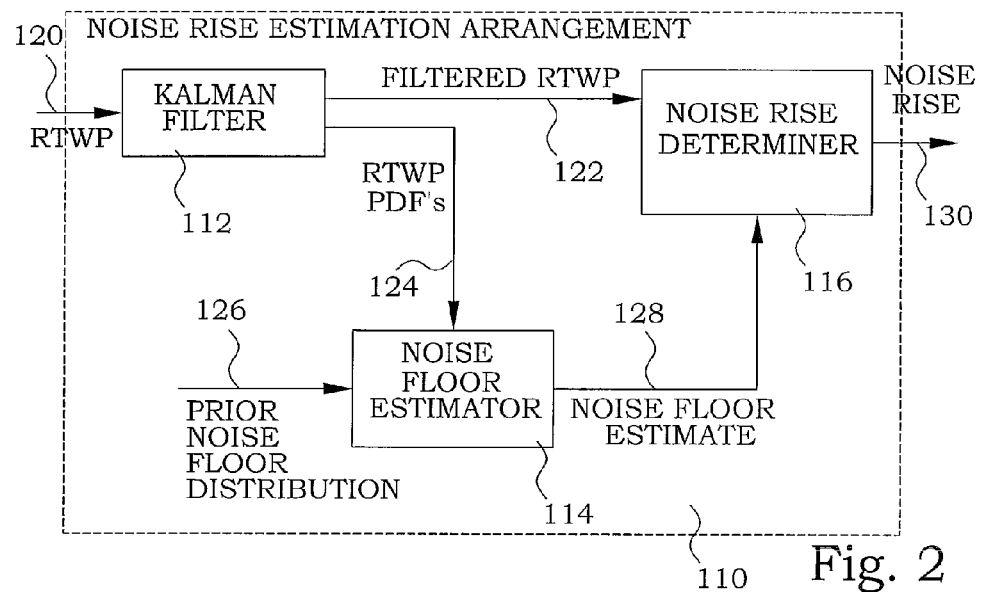
FIG. 2 is a schematic illustration of a noise rise estimation arrangement.

An embodiment of the RoT estimation algorithm currently in use is depicted in FIG. 2. The algorithm estimates the RoT, as given by (A1). The main problem solved by the estimation algorithm is the accurate estimation of the thermal noise floor N(t). Since it is not possible to obtain exact estimates of this quantity due to the neighbour cell interference, the estimator therefore applies an approximation, by consideration of the soft minimum as computed over a relative long window in time.

In particular, an arrangement 110 for noise rise estimation in a wireless communication system is supplied with RTWP measurements 120. The RTWP measurements 120 are used in a Kalman filter 112 to produce filtered estimates 122 of the RTWP as well as probability density functions 124 of the RTWP. These probability density functions 124 are provided to a noise floor estimator 114, in which noise floor estimates 128 are provided with knowledge of a prior noise floor distribution 126. The noise floor estimator 114 operates preferably with a sliding window algorithm. The noise floor estimates 128 and the filtered estimates 122 of the RTWP are provided to a noise rise determiner 116, producing an output of a noise rise measure, in this embodiment a RoT value 130.

It is important to understand that this estimation relies on the fact that the noise floor is constant over very long periods of time (disregarding the small temperature drift).

The sliding window algorithm of the above section has the disadvantage of requiring a large amount of storage memory. This becomes particularly troublesome in case a large number of instances of the algorithm are needed, as may be the case when IC is introduced in the uplink. To reduce the memory consumption a recursive algorithm was disclosed in the published international patent application WO 2007/0055626. That algorithm reduces the memory requirements of the sliding window scheme discussed above at least by a factor of 100. The invention disclosed here is applicable both to the sliding window RoT estimation algorithm and the recursive algorithm of [4].

Figure 3:
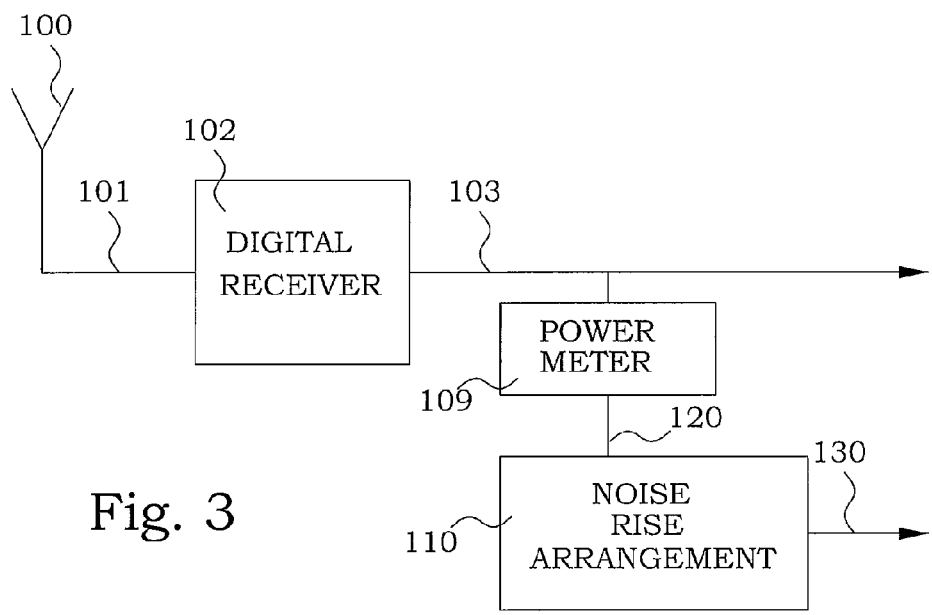
FIG. 3 is a schematic illustration of a receiver chain including a noise rise arrangement.

FIG. 3 schematically illustrates an arrangement 110 for noise rise estimation in relation to the receiver chain. An antenna 100 receives electromagnetic signals and gives rise to a received analogue signal 101, which is provided to a digital receiver 102. The digital receiver 102 provides a stream of digital signals 103 representative to the analogue signals, however, as mentioned above modified with a certain scale factor. A measurement unit 109 is connected to the stream of digital signals 103 and performs measurements of received total wideband powers 120, which are handed on to the arrangement 110 for noise rise estimation.

Figure 4:
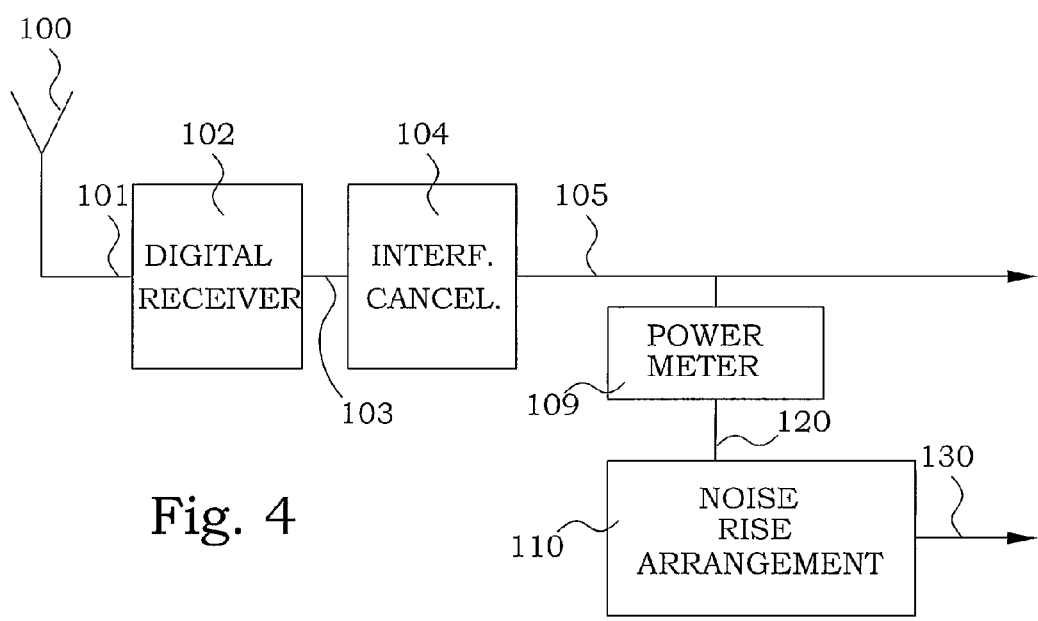
FIG. 4 is a schematic illustration of a receiver chain including interference cancellation and a noise rise arrangement.

As mentioned in the background section, different interference cancellation methods based on regeneration and subtraction are often used. This is schematically illustrated in FIG. 4. The stream of digital signals 103 is provided to an interference canceller 104, where signals not intended for a particular user are removed. An interference cancelled digital signal 105 intended for a particular user is provided as output. As also mentioned before, load estimation can be applied also to such interference cancelled digital signal 105, where the measured RTWP measure refers to the digital signal after interference cancelling. For IC with regeneration and subtraction there is no change of the scale factor for the thermal noise power floor. The consequence is that the RoT estimation algorithms are still applicable in this case, since a constant noise power level is estimated.

It is important to observe that the effect of this procedure is different for different users, since an interferer is a user on its own. The consequence for load estimation is that there is no longer a uniform way to look on the interference of the WCDMA uplink. The load instead becomes individual for each user. Hence combining user interference to a general uplink cell load is no longer trivial.

One important part of several embodiments of the present invention is a load measure that is directly assessing cell stability after interference whitening processing. As stated above the RoT is a general load measure in CDMA systems. Since it includes the neighbour cell interference it e.g. captures coverage effects of load changes. However, sometimes it is desirable to have access to load measures that directly assess the stability only of the serving cell. A measure that addresses this need is to be defined. To achieve this goal it can be noted that in normal operation the uplink cell stability is mainly affected by the powers that are under inner loop power control, by the RBS. This is not perfectly true though, remembering that the loops of the inner loop power control are nonlinear and furthermore coupled and therefore it is not easily guaranteed that large neighbour cell power increases may not affect the cell stability after all. Put otherwise, cell stability is coupled to feasibility which under certain conditions is tied also to the RoT.

Figure 5A:
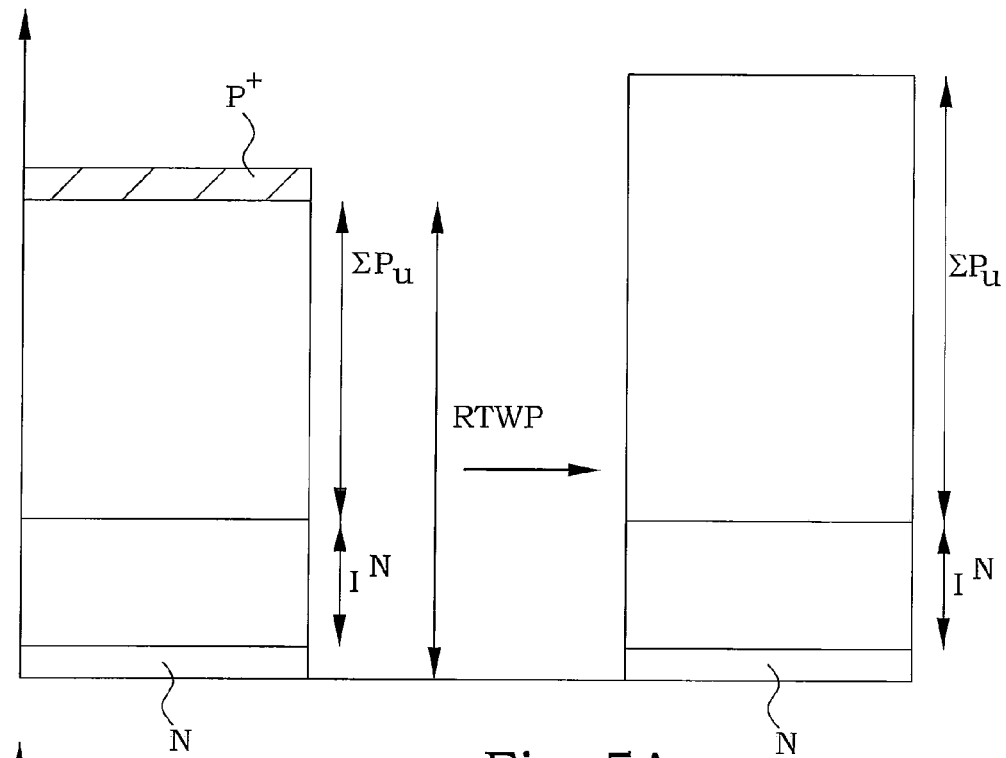
FIGS. 5A-B are schematic illustrations of power scheduling situations with different amounts of neighbour cell interference.
Figure 5B:
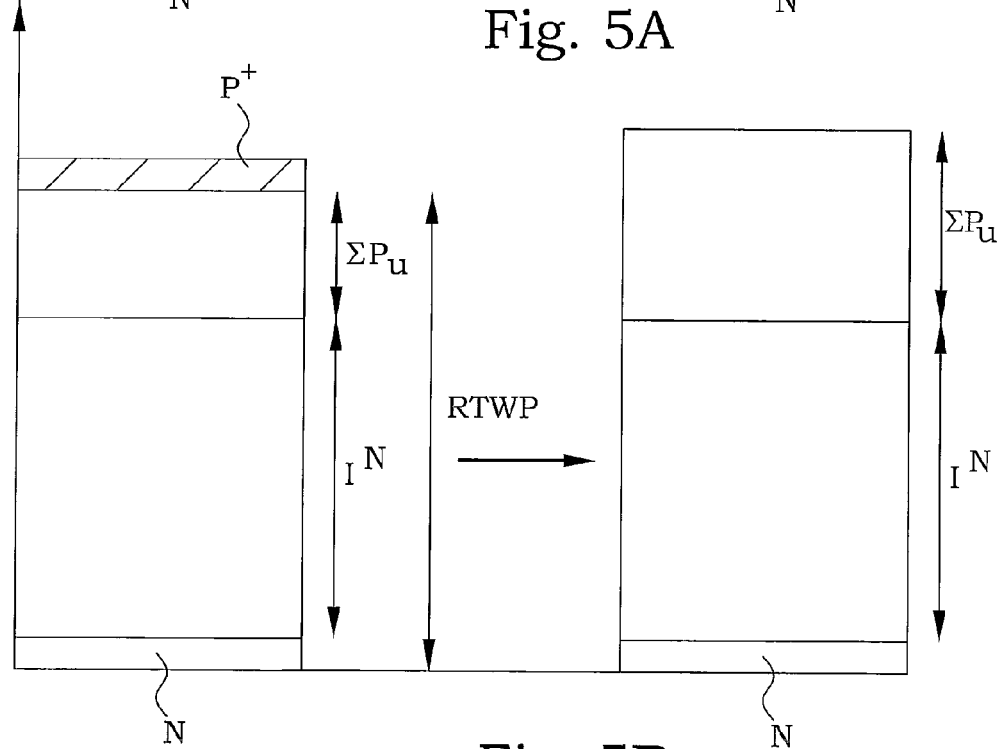

Some of this can be schematically illustrated by the diagrams of FIGS. 5A and 5B. In FIG. 5A a total power RTWP(t) in the left part of the figure is divided according to (3) into the thermal noise N(t), the neighbour cell interference $I^N$(t) and the signal powers $$\sum_{u=1}^{U} P_u(t).$$

If an additional load $P^+$(t) is intended to be scheduled, the inner loop power control will influence the signal powers of the own RBS and the result will be the power situation in the right part of the figure. In FIG. 5B, the total power RTWP(t) and the thermal noise N(t) are the same and thereby the RoT measure. However, since a smaller part of the total power is affected by the inner loop power control, the final situation, in the right part of the figure, will differ from the case in FIG. 5A. The RoT will therefore not always be an appropriate measure to base stability scheduling on. A load measure directly assessing cell stability after interference whitening processing is of great interest.

The discussion concerning this is however somewhat idealized. First, the feasibility analysis is normally based on assumptions that the uplink is shared by a relatively large number of users, allowing interferers to be treated as noise sources. Secondly, the rise over thermal after interference whitening by FDE is an individual measure for each user—no formal proof is available on its precise relation to the uplink cell load and the cell stability issue. For this reason it seems reasonable to address also other measures than the RoT.

In order to obtain a noise rise measure suitable for stability control purposes, the neighbour cell interference can be subtracted from the RoT, possibly for each user, after interference whitening processing.

Several aspects of the present invention are focused on load estimation functionality for FDE and FDPE that addresses cell stability. This document discloses new load estimation algorithms sensitive to interference suppression gains for the FDE and FDPE uplink receiver structures. The load estimation algorithms are extensions in comparison with the standard rise over thermal (RoT) load measure, using also estimates of the neighbor cell interference. Establishment of these noise rise measures as seen after FDE and FDPE processing, requires estimation of the thermal noise floor, also seen after FDE and FDPE processing. Here, prior art solutions are not applicable since FDE and FDPE processing results in a thermal noise floor that is scaled at the FDE processing rate, making prior art solutions impossible to use since these are all based on a constant thermal noise power floor.

Some embodiments of the present invention therefore use a technique for calculation of a momentary scale factor, and using this to compensate for variations of the thermal noise floor as seen after FDE or FDPE processing. With this solution in place, the stability related noise rise can be calculated using also estimates of the neighbor cell interference. For FDPE this noise rise measure is directly applicable to the uplink of the cell, whereas for the FDE the noise rise is related to the particular user. Finally, for the FDE, the stability related noise rise of all users with FDE are combined to a measure of the uplink WCDMA stability related noise rise.

First FDE processing is discussed. A more detailed mathematical approach is presented in Appendix C. In order to address the stability related load a neighbor cell interference, as seen after the FDE processing needs to be subtracted from the numerator of the RoT ratio, c.f. e.g. (A1). This follows since the neighbor cell interference does not affect the stability of the own cell due to the fact that the neighbor cell interference is not controlled by the own cell. A relation (c.f. (C4)):

$$NR^{FDE}(t) = \frac{z_{FDE}^H(t)z_{FDE}(t) - \hat{I}_{FDE}^{neighbor}(t)}{E[(w(t)*n^{thermal}(t))^H(w(t)*n^{thermal}(t))]}, \quad (1)$$

is achieved. Explanations of the terms are found in Appendix C. Evaluating the different terms leads to the reformulated relation (c.f. (C8)):

$$NR^{FDE}(t) = \frac{z_{FDE}^H(t)z_{FDE}(t)}{\kappa\hat{N}} - \frac{\hat{I}^{neighbor}(t)}{\hat{N}}, \quad (2)$$

where $\hat{N}$ is a noise floor estimation, $\hat{I}^{neighbor}(t)$ is the neighbor cell interference before FDE processing, $\kappa$ is a noise floor compensation factor for a specific user due to the FDE processing and $z_{FDE}^H(t)z_{FDE}(t)$ is a useful signal power after interference whitening for a specific user.

Since the load measure is valid for a specific user, the procedure is repeated for a number of users, and preferably all users. A system load measure is then determined from the set of individual load measures. In some embodiments, the highest load is assumed to limit the uplink, and the uplink load relevant for stability is defined to be (c.f. (C9)):

$$NR = \max_u NR_u^{FDE}. \quad (3)$$

For FDPE processing, a more detailed mathematical approach is presented in Appendix D. In order to address the stability related load a neighbor cell interference, as seen after the FDPE processing, needs to be subtracted from the numerator of the RoT ratio, c.f. e.g. (A1). This follows since the neighbor cell interference does not affect the stability of the own cell due to the fact that the neighbor cell interference is not controlled by the own cell. A relation (c.f. (D4)):

$$NR^{FDPE}(t) = \frac{z_{pre}^H(t)z_{pre}(t) - \hat{I}_{pre}^{neighbor}(t)}{E[(w_{pre}(t)*n^{thermal}(t))^H(w_{pre}(t)*n^{thermal}(t))]}, \quad (4)$$

is achieved. Explanations of the terms are found in Appendix D. Evaluating the different terms leads to the reformulated relation (c.f. (C8)):

$$NR^{FDPE}(t) = \frac{z_{pre}^H(t)z_{pre}(t)}{\kappa\hat{N}} - \frac{\hat{I}^{neighbor}(t)}{\hat{N}}, \quad (5)$$

where $\hat{N}$ is a noise floor estimation, $\hat{I}^{neighbor}(t)$ is the neighbor cell interference before FDPE processing, $\kappa$ is a noise floor compensation factor due to the FDPE processing and $z_{pre}^H(t)z_{pre}(t)$ is a useful signal power after interference whitening.

FIG. 6 illustrates schematically an arrangement 10 for assisting load scheduling in a wireless communication system. The arrangement 10 comprises a digital receiver 12, an interference whitener 14 and a processor 20. The interference whitener 14 is connected to the digital receiver 12 for receiving digital signals therefrom. The interference whitener 14 is generally based on one of FDE and FDPE. The interference whitener 14 is intended for providing interference whitening for a plurality of users at an output, providing interference whitened digital signals 44.

The processor 20 is connected to the digital receiver 12 and to an output from the interference whitener 14. The processor 20 has in this embodiment a power meter 22, arranged for measuring received total wideband power 46 of the signals 42 received at the digital receiver 12 a plurality of times. These measured received total wideband powers 46 are provided at an output from the power meter 22. The power meter 22 is further arranged for generating a measure of an own cell power 45 a plurality of times. Also these generated measures of an own cell power 45 are provided at an output from the power meter 22.

The processor 20 has further a noise floor estimator 24 connected to the output of the power meter 22. The noise floor estimator 24 is arranged for computing an estimate of a noise floor measure $\hat{N}$ 48. In this particular embodiment, the noise floor measure $\hat{N}$ 48 is based on at least a number of the measured received total wideband powers 46 and generated measures of an own cell power 45. In alternative embodiments, a noise floor measure can be computed in alternative ways according to prior art.

In addition to the noise floor estimator 24, the processor 20 has a neighbour interference estimator 25 connected to the output of the power meter 22 and to the noise floor estimator 24. The neighbour interference estimator 25 is configured to compute an estimate of a neighbour cell interference power $\hat{I}_n$ 47. In the present embodiment, the computation of the neighbour cell interference power is based on at least a number of the measured received total wideband powers and generated measures of an own cell power. In alternative embodiments, a neighbour cell interference power can be computed in alternative ways according to prior art.

In the present embodiment, the processor also comprises a second power meter 30 that is connected to be responsive to interference whitened digital signals 44 output from the interference whitener 14. In this second power meter 30, a useful signal power is determined as defined after the interference whitening.

The processor 20 is further arranged for calculating a noise rise measure for individual users, taking the effect of the interference whitening into account. For this task a number of input factors are needed. During the interference whitening process, wideband finite impulse responses w 50 are obtained, see e.g. equations (C2, D2). These wideband finite impulse responses w are supplied to a compensation factor calculating section 26 of the processor 20. As will be described more in detail further in the Appendices C and D below, a noise floor compensation factor κ 52 is preferably based on a wideband finite impulse response of an equalizing filter used in the interference whitening. Even more preferably, the noise floor compensation factor κ 52 is derived as a wideband finite impulse response power. The wideband finite impulse responses w 50 are provided to the compensation factor calculating section 26 from the interference whitener 14.

The processor 20 further comprises a noise rise calculator arrangement 28. In this noise rise calculator arrangement 28 a noise rise measure NR is calculated based at least on the useful signal power z 56 after interference whitening, the noise floor compensation factor κ 52, the estimated neighbour cell interference $\hat{I}_n$ power 47 and the noise floor measure $\hat{N}$ 148. Consequently, the noise rise calculator arrangement 28 is thereby connected to the compensation factor calculating section 26, the second power meter 30, the noise floor estimator 24 and the neighbour interference estimator 25. As was explained more in detail above, the said noise rise measure is calculated as the useful signal power after interference whitening divided by a product of the noise floor compensation factor and the noise floor measure, and subtracted by a ratio between the estimated neighbor cell interference power and the noise floor measure.

In this embodiment, the different functionalities of the processor 20 are illustrated as separate part units. However, anyone skilled in the art realises that the functionalities can be configured and realised in different manners, separately or integrated, fully or partly. The part units associated with the different functionalities should therefore only be considered as separate units concerning their functionality.

The arrangement 10 for assisting load scheduling is in a typical embodiment provided in or in connection to a load scheduler of a wireless communication system. The load scheduler may also be considered as a part of the arrangement 10 for assisting load scheduling. Such a load scheduler is preferably configured to schedule uplink load in the wireless communication system based on the estimated noise rise measure. The load scheduler and/or the arrangement 10 for assisting load scheduling are typically comprised in a base station of a wireless communication system, e.g. as illustrated in FIG. 1.

If the interference whitening of the interference whitener 14 in the embodiment of FIG. 6 is based on frequency domain pre-equalizing, the interference whitened digital signals 44 are thus signals typically according to a version of (B9) transferred to the time domain. The interference whitening is thus performed in common for all users. The useful signal power after interference whitening is therefore determined as a useful signal power after interference whitening for all users. The noise floor compensation factor is also derived as a noise floor compensation factor for all users, and the noise rise measure is calculated as a noise rise measure valid for all users.

Figure 7:
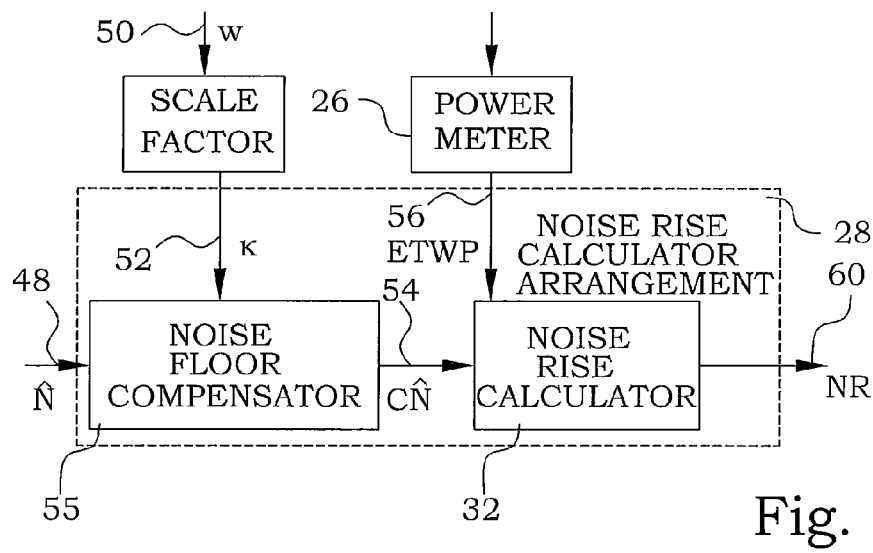
FIGS. 7-9 are block schemes of embodiments of noise rise calculator arrangements in a system using FDPE.

In FIG. 7, a part embodiment of a noise rise calculator arrangement used in an embodiment of FIG. 6 utilizing frequency domain pre-equalizing is illustrated. The noise rise calculator arrangement 28 here comprises a noise floor compensator 55, connected to the compensation factor calculating section 26 and the noise floor estimator 24 and arranged for deriving a noise floor measure $C\hat{N}$ 54 being compensated for the effect of the interference whitening. A noise rise calculator 32, connected to the noise floor compensator 55 and the second power meter 30, calculates the final noise rise measure NR 60.

Figure 8:
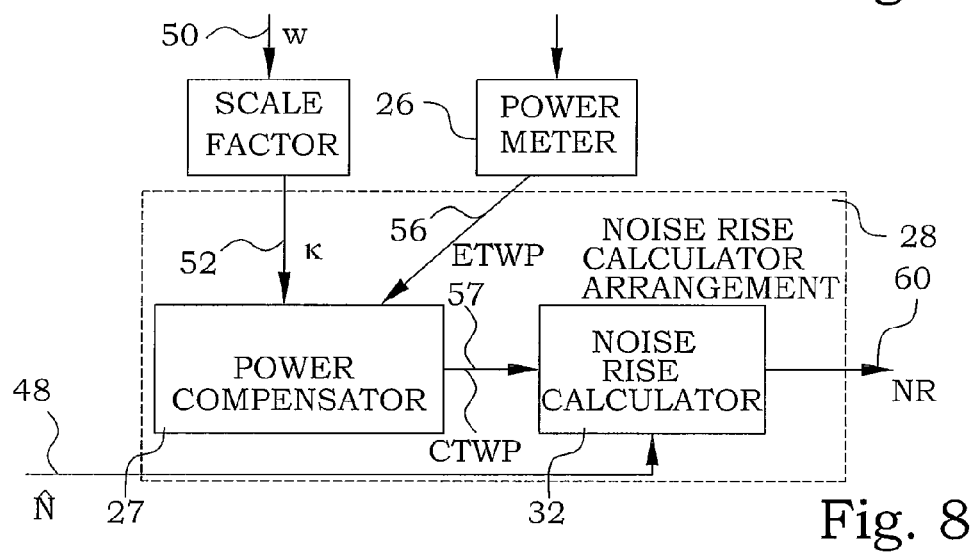

In FIG. 8, another part embodiment of a noise rise calculator arrangement used in an embodiment of FIG. 6 utilizing frequency domain pre-equalizing is illustrated. The noise rise calculator arrangement 28 here comprises a power compensator 27, connected to the compensation factor calculating section 26 and the second power meter 30 and arranged for deriving a power measure CTWP 57 being compensated for the effect of the interference whitening. A noise rise calculator 32, connected to power compensator 27 and the noise floor estimator 24, calculates the final noise rise measure NR 60.

Figure 9:
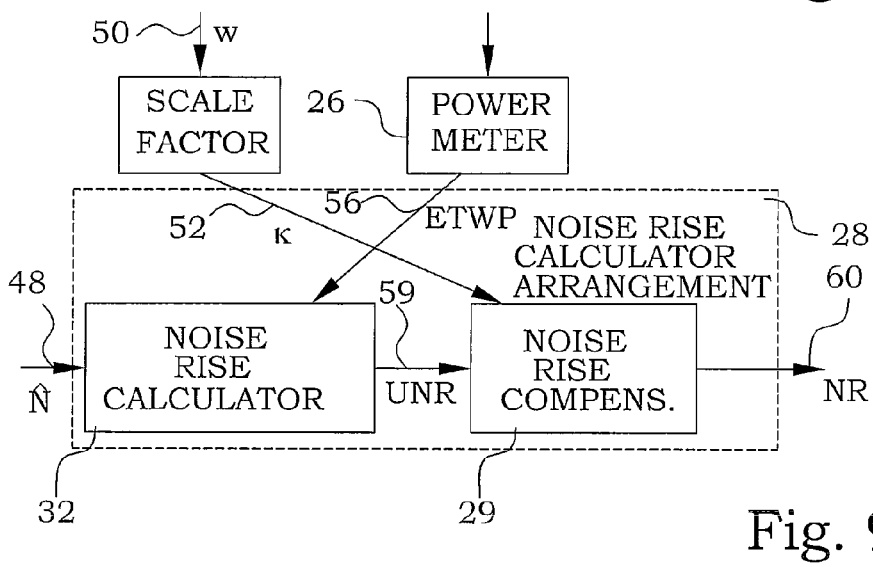

In FIG. 9, yet another part embodiment of a noise rise calculator arrangement used in an embodiment of FIG. 6 utilizing frequency domain pre-equalizing is illustrated. The noise rise calculator arrangement 28 here comprises a noise rise calculator 32, connected to the second power meter 30 and the noise floor estimator 24. The noise rise calculator 32 calculates a noise rise measure UNR 59, which does not take the effect of the interference whitening into account. A noise rise compensation section 29, connected to the noise rise calculator 32 and the compensation factor calculating section 26, is then arranged for compensating for the effects of the interference whitening, giving the final noise rise measure NR 60.

Figure 10:
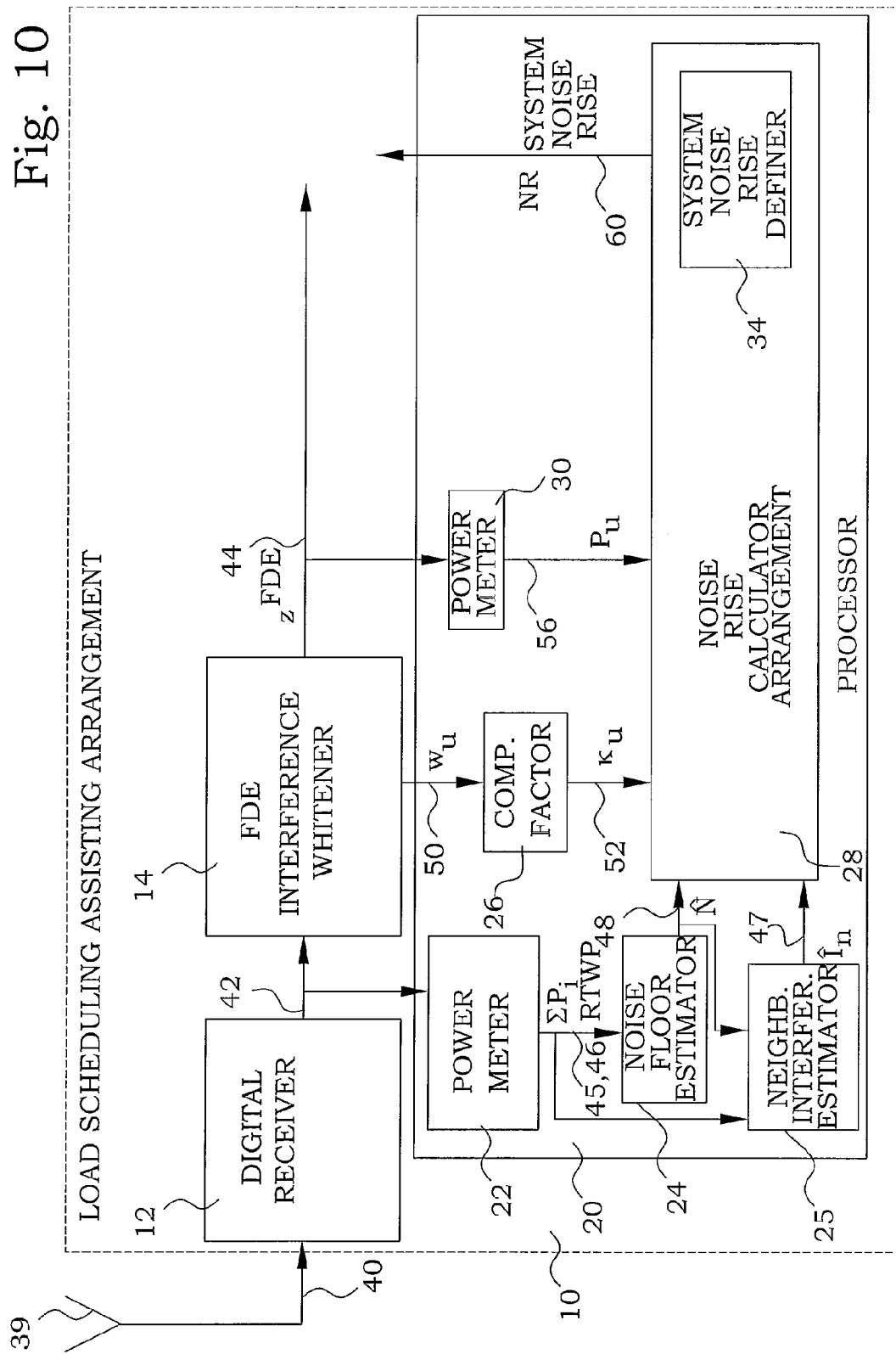
FIG. 10 is a block scheme of another embodiment of a load scheduling assisting arrangement according to the present invention.

In FIG. 10, another embodiment of an arrangement 10 for assisting load scheduling in a wireless communication system is disclosed. In this embodiment the interference whitening is based on FDE. As mentioned above, FDE performs the interference whitening individually for each user. Therefore, the interference whitening is first performed for a first user, the useful signal power after interference whitening is determined for the first user, the noise floor compensation factor is derived for the first user, and the noise rise measure is calculated for the first user. The processor 20 is then further configured for repeating the estimating, performing determining, deriving and calculating for a plurality of users. When an individual noise rise measure is calculated for this plurality of users, the noise rise calculator arrangement 28 has a system noise rise definer 34, which is arranged for defining a system noise rise measure based on the respective noise rise measure for the plurality of users. The system noise rise may be defined in different ways, but the definition that presently is believed to be preferred is a system noise rise measure defined as a maximum noise rise of the respective noise rise measure for the plurality of users, as indicated in Appendix C.

Figure 11:
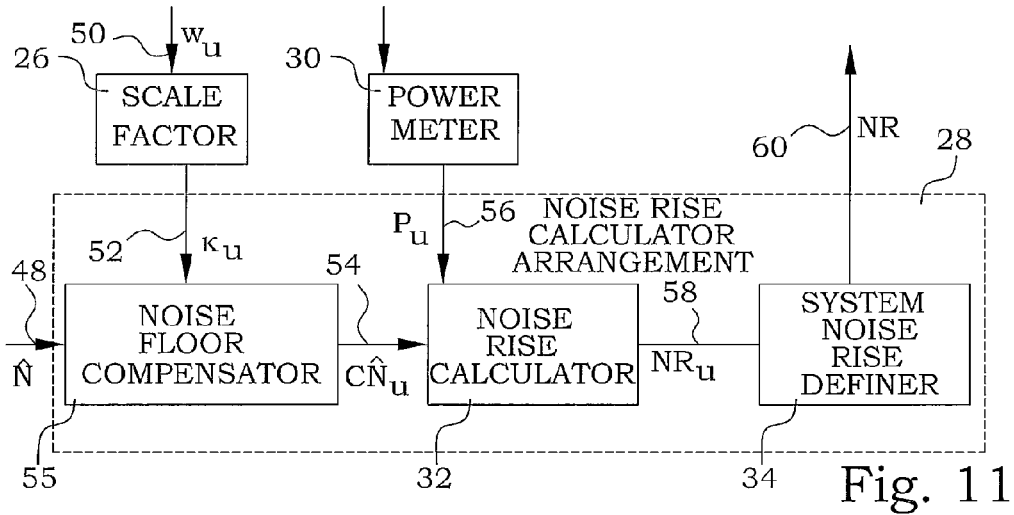
FIGS. 11-13 are block schemes of embodiments of noise rise calculator arrangements in a system using FDE.
Figure 12:
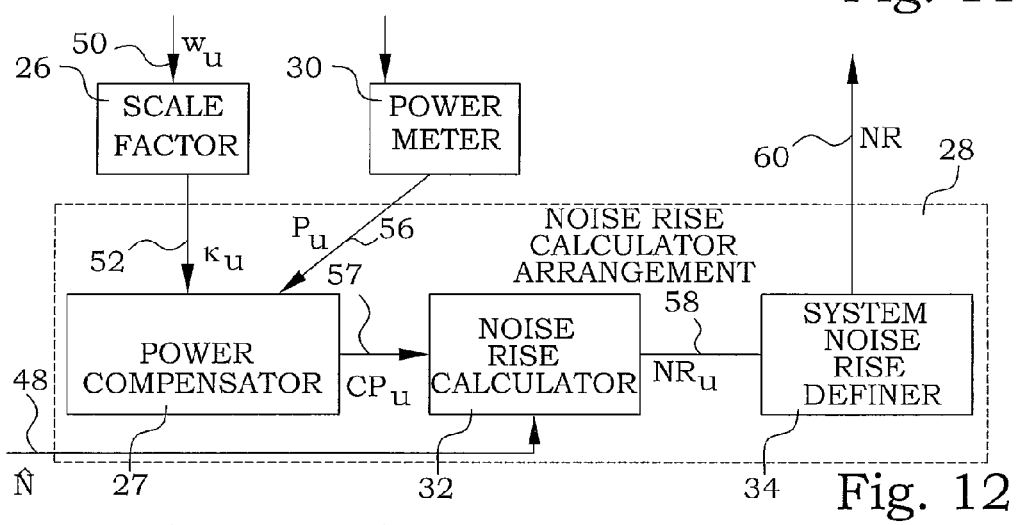
Figure 13:
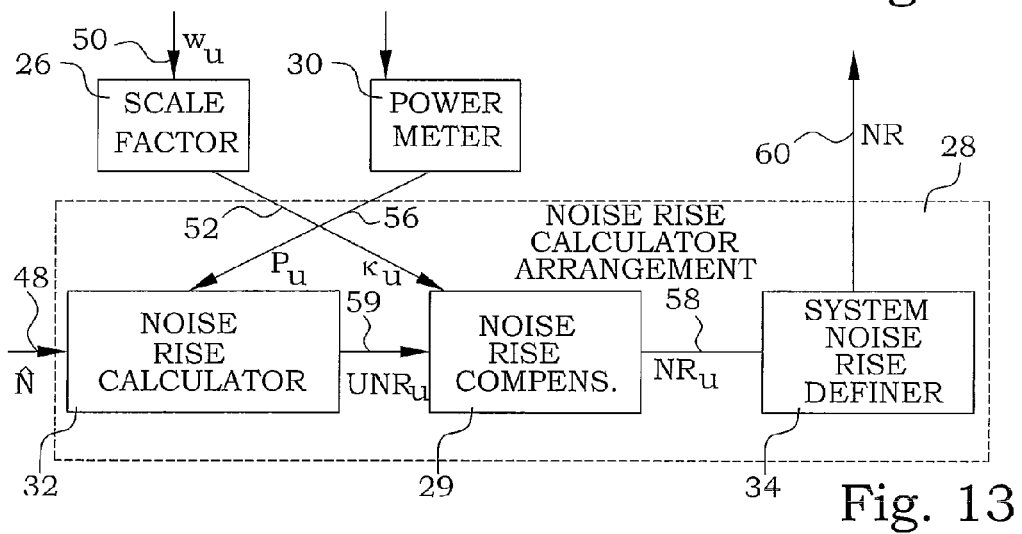

In FIGS. 11-13, different embodiments of a noise rise calculator arrangement 28 used in the embodiment of FIG. 10 are illustrated. The compensation factor, which now is individual for each user, is introduced in different ways in the process of finding a noise rise measure, in analogy with the embodiments of FIGS. 7-9. Note, however, that since the compensation factor may be different from one user to another, the compensation has to be performed before the system noise rise measure is defined.

Figure 14:
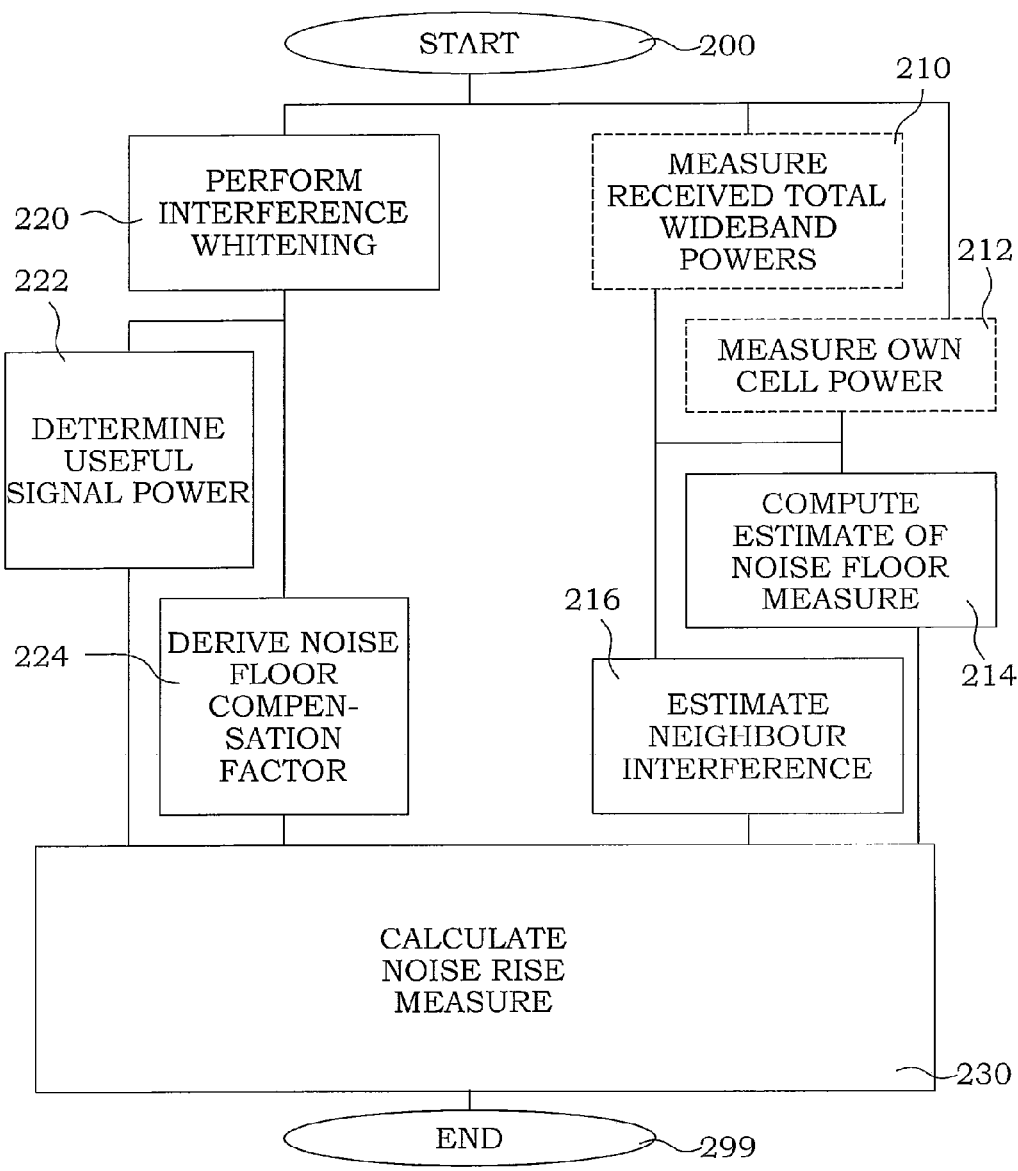
FIGS. 14-15 are flow diagrams of embodiments of methods for assisting load scheduling.

FIG. 14 illustrates a flow diagram of steps of an embodiment of a method for assisting load scheduling in a wireless communication system. The method starts in step 200. In step 210, received total wideband power is measured a plurality of times. In step 212, a measure of an own cell power is generated a plurality of times. An estimate of a noise floor measure for received uplink radio signals is computed in step 214. The computing of an estimate of a noise floor measure is in the present embodiment based on at least a number of the measured received total wideband powers and the generated measures of an own cell power. A neighbor cell interference power is estimated in step 216. In the present embodiment, the estimating of a neighbor cell interference power is based on at least a number of the measured received total wideband powers and the generated measures of an own cell power. In alternative embodiments, the steps 210 and/or 212 may be omitted and the noise floor measure and/or neighbor interference may be obtained according to other prior art routines.

In step 220, an interference whitening of the received uplink radio signals is performed based on frequency domain equalizing or frequency domain pre-equalizing. A useful signal power after interference whitening is determined in step 222 and in step 224, a noise floor compensation factor is derived. In step 230, a noise rise measure is calculated based at least on the useful signal power after interference whitening, the noise floor compensation factor, the noise floor measure and the estimated neighbor cell interference power. The procedure is ended in step 299.

The procedure of FIG. 14 is typically followed by a scheduling of uplink load in the wireless communication system based on the estimated noise rise measure.

In the embodiment of FIG. 14, when the interference whitening is based on frequency domain pre-equalizing, the processed quantities are valid for all users. In particular, the interference whitening is performed in common for all users, the useful signal power after interference whitening is determined as a useful signal power after interference whitening for all users, the noise floor compensation factor is derived as a noise floor compensation factor for all users, and the noise rise measure is calculated as a noise rise measure for all users.

Figure 15:
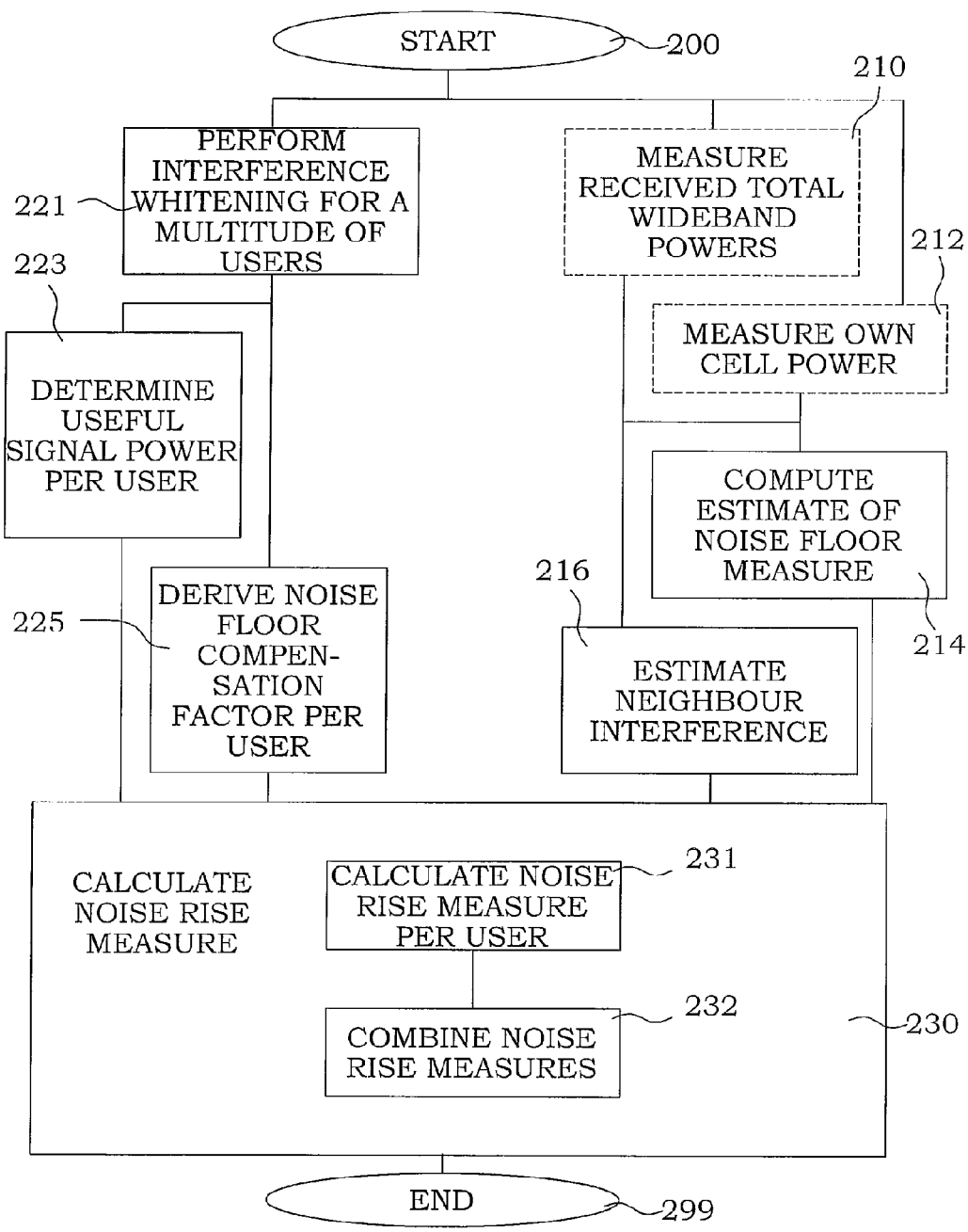

In FIG. 15, another embodiment of a method for assisting load scheduling in a wireless communication system is illustrated. In this embodiment, the interference whitening is based on frequency domain equalizing. This means that the interference whitening is performed for each of a plurality of users, as in step 221. The useful signal power after interference whitening is determined for each of the plurality of users, as illustrated in step 223. The noise floor compensation factor is, in step 225, derived for each user. In step 231, a noise rise measure is first calculated for each individual user. A system noise rise measure is then defined in step 232 based on the respective noise rise measure for the plurality of users. In a presently preferred embodiment, the system noise rise measure is defined as a maximum noise rise of the respective noise rise measure for the plurality of users.

Embodiments of the present invention have been studied for implementation in the baseband ASIC on the WCDMA RBS hardware. The techniques and apparatus disclosed herein have been seen to be very advantageous for throughput, capacity and coverage gains associated with the receiver structure. A further advantage of several embodiments of the present invention is that no additional measurements are required at ASIC level.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

Load without IC

It is e.g. shown in [1], [2] that without IC, the load at the antenna connector is given by the noise rise, or rise over thermal, RoT(t), defined by:

$$RoT(t) = \frac{RTWP(t)}{N(t)}, \tag{A1}$$

where N(t) is the thermal noise level as measured at the antenna connector. The RTWP(t) is unaffected of any despreading applied. The definition used here is simply the total wideband power:

$$RTWP(t) = \sum_{u=1}^{U} P_u(t) + I^N(t) + N(t), \tag{A2}$$

also measured at the antenna connector. Here $I^N(t)$ denotes the power as received from neighbor cells, N, of the WCDMA system. As will be seen below, the major difficulty of any RoT estimation algorithm is to separate the thermal noise power from the interference from neighbor cells.

Another specific problem that needs to be addressed is that the signal reference points are by definition at the antenna connector. The measurements are, however, obtained after the analogue signal conditioning chain, in the digital receiver. The analogue signal conditioning chain does introduce a scale factor error of about 1-3 dB (1-sigma) that is difficult to compensate for. Fortunately, all powers of (A2) are equally affected by the scale factor error so when (A1) is calculated, the scale factor error is cancelled as:

$$RoT^{DigitalReceiver}(t) = \frac{RTWP^{DigitalReceiver}(t)}{N^{DigitalReceiver}(t)} \tag{A3}$$
$$= \frac{\gamma(t)RTWP^{Antenna}(t)}{\gamma(t)N^{Antenna}(t)}$$
$$= RoT^{Antenna}(t).$$

In order to understand the fundamental problem of neighbor cell interference when performing load estimation, note that:

$$I^N(t)+N(t)=E[I^N(t)]+E[N(t)]+\Delta I^N(t)+\Delta N(t), \tag{A4}$$

where E[ ] denotes mathematical expectation and where Δ denotes the variation around the mean. The fundamental problem can now be clearly seen. Since there are no measurements available in the RBS that are related to the neighbor cell interference, a linear filtering operation can at best estimate the sum $E[I^N(t)]+E[N(t)]$. This estimate cannot be used to deduce the value of E[N(t)]. The situation is the same as when only the sum of two numbers is available. Then, there is no way to figure out the values of the individual numbers. This issue is analyzed rigorously for the RoT estimation problem in [2] where it is proved that the noise power floor is not mathematically observable.

RoT Estimation Algorithms without IS/IC in Prior Art

Sliding Window Algorithm

The RoT estimation algorithm currently in use is depicted in FIG. 2. It is described in detail in [1]. The algorithm estimates the RoT, as given by (A1). The main problem solved by the estimation algorithm is the accurate estimation of the thermal noise floor N(t). Since it is not possible to obtain exact estimates of this quantity due to the neighbor cell interference, the estimator therefore applies an approximation, by consideration of the soft minimum as computed over a relative long window in time.

It is important to understand that this estimation relies on the fact that the noise floor is constant over very long periods of time (disregarding the small temperature drift).

Recursive Algorithm

The sliding window algorithm of the above section has the disadvantage of requiring a large amount of storage memory. This becomes particularly troublesome in case a large number of instances of the algorithm are needed, as may be the case when IC is introduced in the uplink.

To reduce the memory consumption a recursive algorithm was disclosed in the published international patent application [4]. That algorithm reduces the memory requirements of the sliding window scheme discussed above at least by a factor of 100.

IC with Regeneration and Subtraction

The conventional procedure to perform IC is summarized by the following steps. The channel model of the interferer to be canceled is estimated. This is anyway needed. Then, the transmitted signal of the interferer to be cancelled is decoded. This is also anyway needed. A replica of the received signal of the interferer to be cancelled is created by use of the channel model and the decoded signal. This replica may e.g. be reconstructed as an IQ stream. The replica of the interfering signal is subtracted from the received signal of the user to be decoded, thereby hopefully reducing the remaining power of the interferer to very low power levels.

It is important to observe that the effect of this procedure is different for different users, since an interferer is a user on its own. The consequence for load estimation is that there is no longer a uniform way to look on the interference of the WCDMA uplink—the load becomes individual for each user.

Finally, note that the RoT estimation algorithms are still applicable in this case, since a constant noise power level is estimated.

Cell Stability Assessment

Prior art cell stability load estimation functionality exploits load factors for each user. In their simplest form the load factors are given by:

$$L_u = \frac{P_u}{RTWP} = \frac{(C/I)_u}{1+(C/I)_u}, u=1, \ldots, U, \tag{A5}$$

where $P_u$ is the power of user u. Load factors are then summed up, for each power controlled user. In this way the neighbor cell interference is not included in the resulting load measure. This is reasonable since the neighbor cell interference should not affect the own cell power control loop, at least not when first order effects are considered.

APPENDIX B

Frequency Domain Equalization

Figure 16:
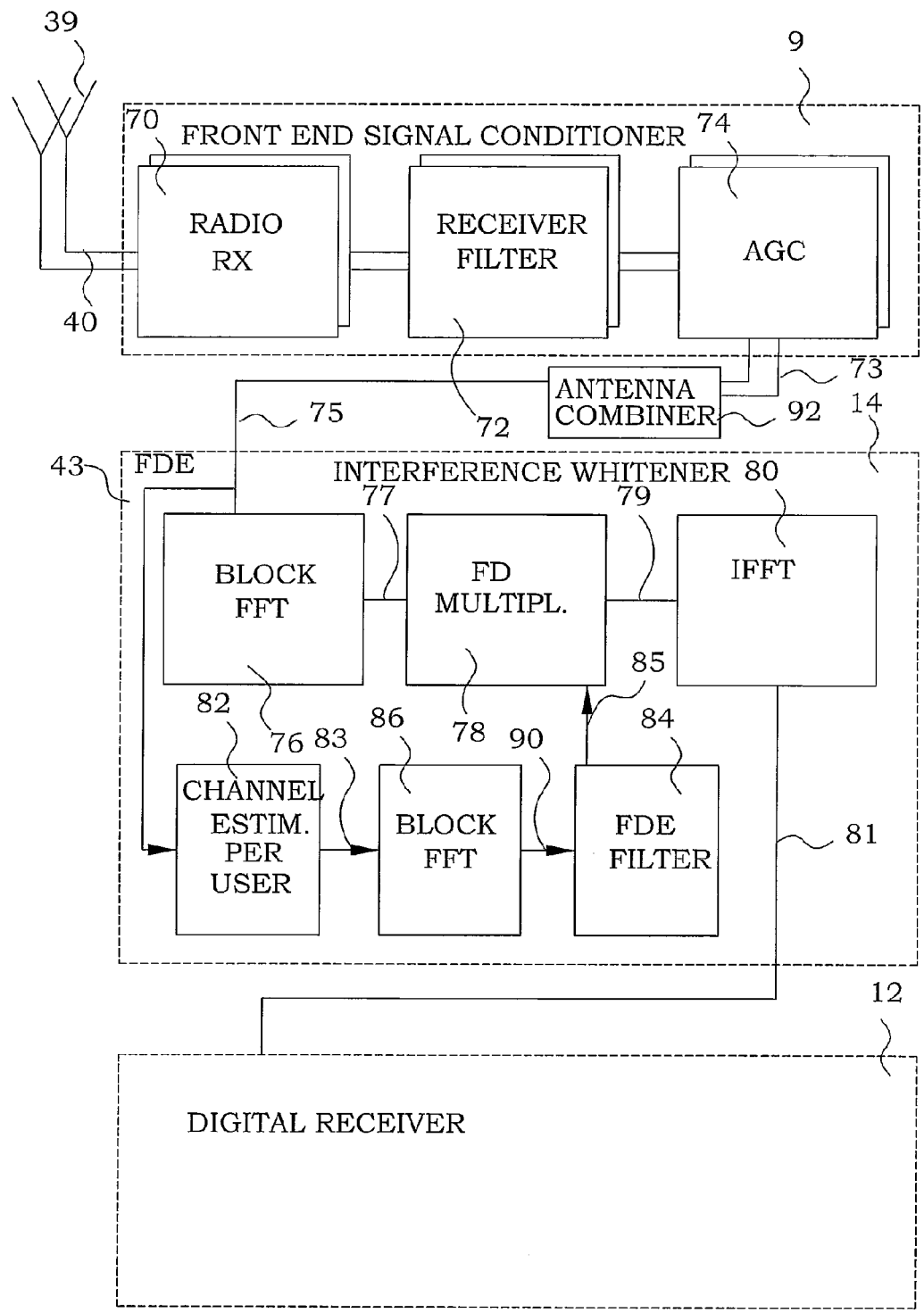
FIGS. 16-17 are block schemes of FDE receiver structures.

The present description is at least partly derived from a presentation of the FDE algorithm in [5]. An embodiment of a general FDE receiver structure is depicted in FIG. 16. A multiple of antennas 39 provides signals 40 to a radio receiver 70 of a front end signal conditioner 9. The front end signal conditioner 9 typically also comprises a receiver filter 72 and an Automatic Gain Control (AGC) function. The signals 73 output from the front end signal conditioner 9 are provided via an antenna combiner 92, in which the signals from the individual antennas are combined into one common signal 75, to an interference whitener 14, in this embodiment a FDE unit 43.

The FDE algorithm performs equalization and interference suppression in the frequency domain. To explain this in detail, the following time domain signal model can be used:

$$v(t) = \sum_{l=0}^{L-1} h(l)z(t-l) + \eta_v(t). \tag{B1}$$

Here v is the received (vector due to multiple antennas) signal, h is the radio channel net response, z is the desired (transmitted) signal and $\eta_v$ denotes thermal noise and interference. t denotes discrete time.

The FDE unit 43 comprises a block FFT (Fast Fourier Transform) 76 for transforming the incoming signal 75 of a time domain as described above into a signal 77 in the frequency domain. This signal can be modeled by taking the Fourier transform, translating (B1) into:

$$V(m)=H(m)Z(m)+N(m) \tag{B2}$$

where the quantities are the discrete Fourier transform of the corresponding quantities in (B1).

Now MMSE equalization can be performed on V(m). For this purpose, the channel is estimated using the pilot signal. In FIG. 16, the MMSE filter coefficients are directly computed. For this purpose, the common signal 75 is also provided to a channel estimator per user 82, which unscramble the common signal 75 by use of pilot signals to extract signals for each user and performs a channel estimation for each user. The channel estimation results in the determination of the radio channel net response 83, also referred to as h(l) in eq. (B1) above. In the present embodiment, the radio channel net response 83 is supplied to a block FFT 86, providing a corresponding sampled channel frequency response vector 90, also referred to as H(m) in eq. (B2) above. MMSE filter coefficients 85 (W(m)) are computed in a FDE filter 84 of the frequency domain, in this embodiment as:

$$W(m)=H^H(m)(H(m)H^H(m)+\hat{N})^{-1} \tag{B3}$$

where $\hat{N}$ is the thermal noise power floor matrix estimate, obtained e.g. by any of the algorithms of [1], [2] or [4], and where H(m) is the sampled channel frequency response vector. The method according to (B3) has a low computational complexity and therefore it represents the preferred embodiment for implementation of the FDE.

Finally, the equalized signal 79 ($Z_{FDE}(m)$) in the frequency domain is computed by a frequency domain multiplicator 78, operating at the signal 77 in the frequency domain V(m) by the MMSE filter coefficients 85 according to:

$$Z_{FDE}(m)=W(m)V(m), \tag{B4}$$

after which the inverse FFT is applied to get the signal $z_{FDE}(t)$. After this step processing proceeds as in a conventional WCDMA system.

This constitutes an interference whitening process. In other words, the use of the MMSE filter coefficients makes the spectrum of the signal more flat, thereby reducing any spectral peaks. As a consequence the interference level is improved as well. The equalized signal 79 is provided to an IFFT (Inverse Fast Fourier Transform) unit 80 for transforming the signal back into a signal 81 $z_{FDE}(t)$ of the time domain. The so interference whitened signal 81 is then provided to the digital receiver 12. The FDE is also sometimes classified as an IS (interference suppression) technique.

Figure 17:
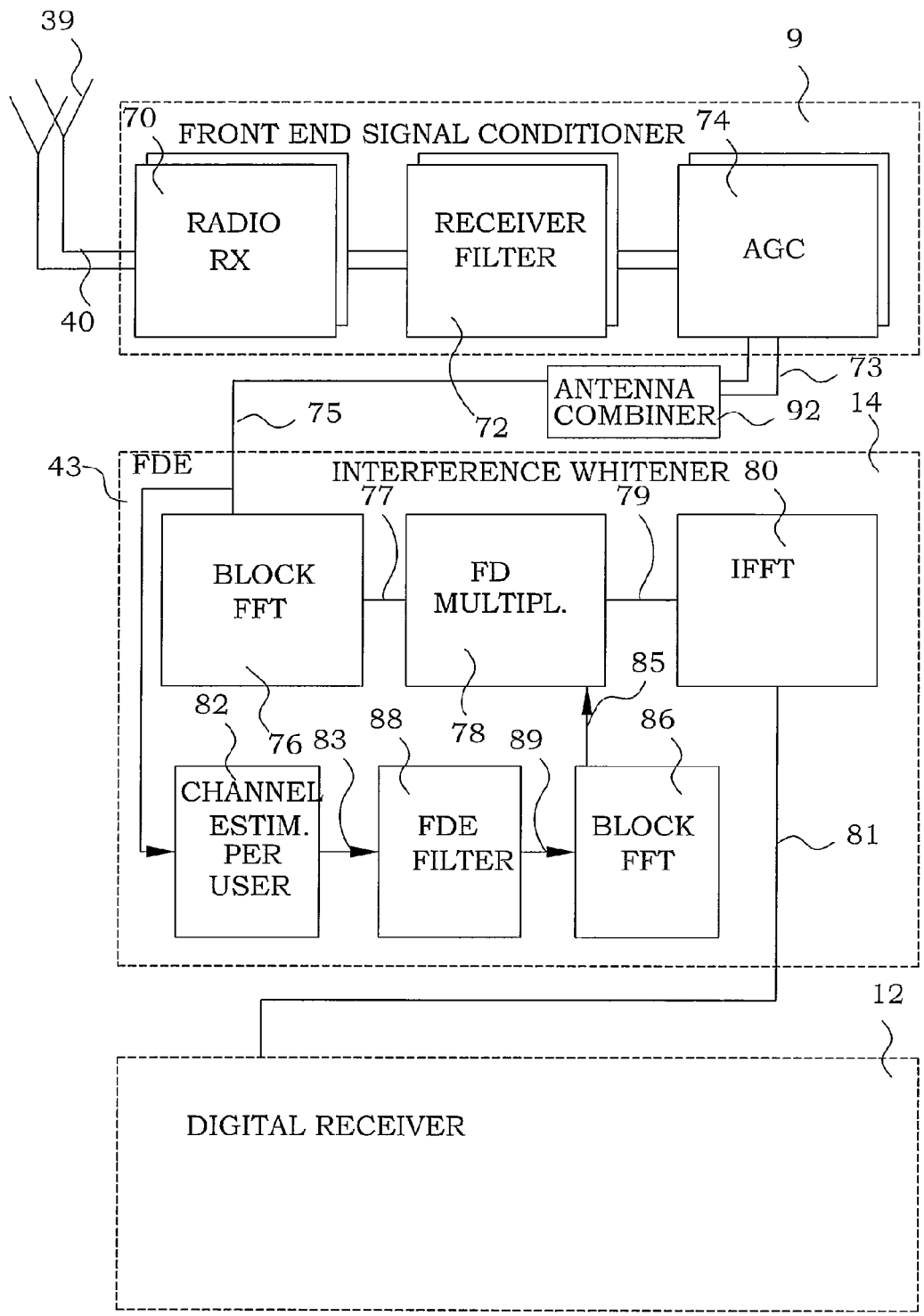

FIG. 17 illustrates an alternative embodiment of a general FDE receiver structure. Here, a MMSE filter 88 for the FDE uses time domain calculations. In this embodiment, the radio channel net response 83, (h(l)) is provided to a FDE filter 88. This filtering is possible to perform, but is presently considered to be computationally more complex than the FDE filter of FIG. 16. The FDE filter 88 provides MMSE filter coefficients 89 (w(l)), however, now in the time domain. A block FFT 86 is then utilized to transform the MMSE filter coefficients 89 of the time domain into MMSE filter coefficients 85 (W(m)) of the frequency domain in order to be used in the equalizing multiplication. It is thus possible, however, presently not assumed preferable, to make the filter operations in the time domain while the actual equalization takes place in the frequency domain.

Frequency Domain Pre-Equalization

Figure 18:
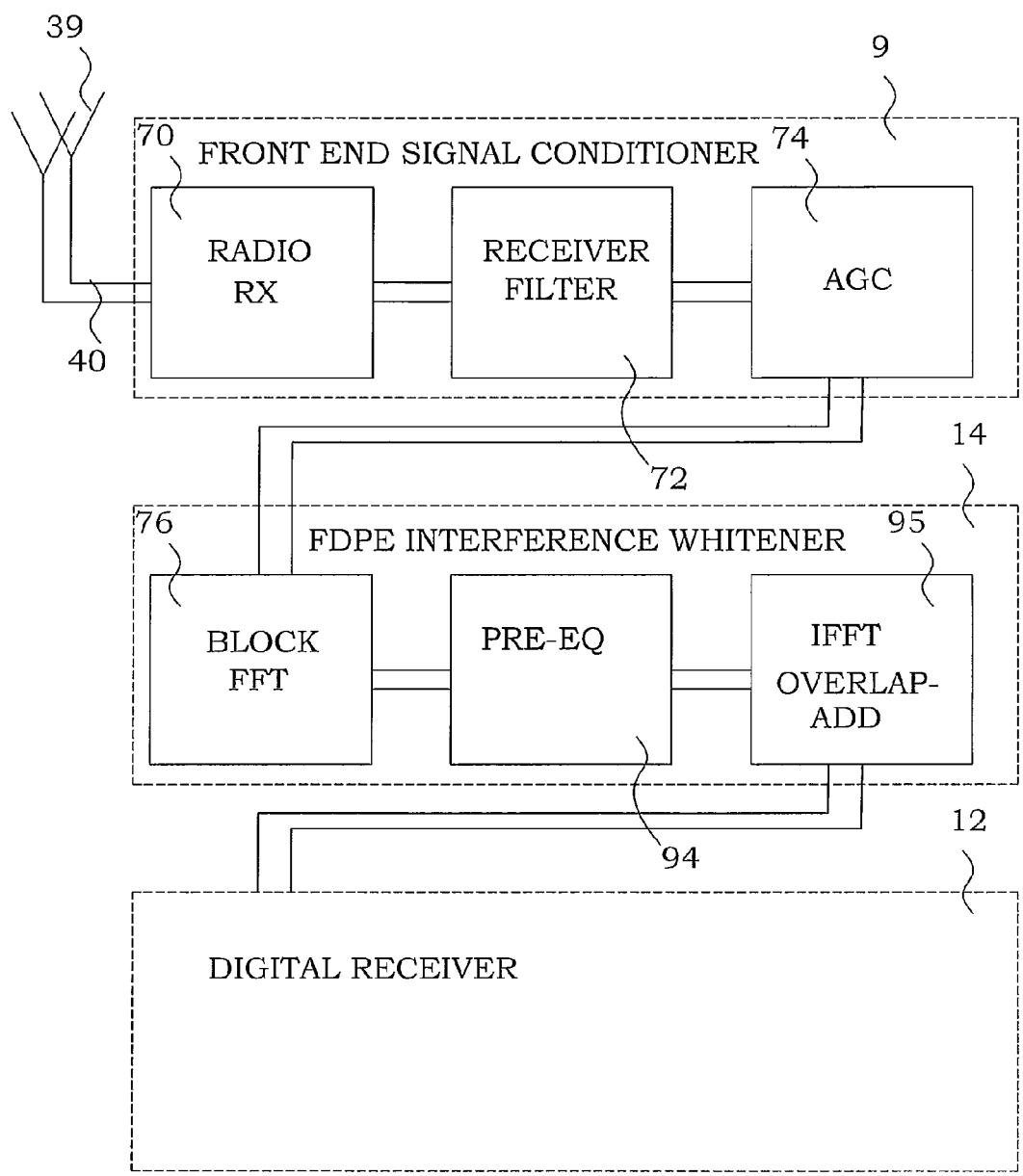
FIG. 18 is a block diagram of a FDPE receiver structure.

The FDPE receiver structure is depicted in FIG. 18. A multiple of antennas 39 provides signals 40 to a radio receiver 70 of a front end signal conditioner 9. The front end signal conditioner 9 typically also comprises a receiver filter and an Automatic Gain Control (AGC) function. The signals 42 output from the front end signal conditioner 9 are provided to an interference whitener 14, in this embodiment a FDPE unit 43. The FDPE unit 43 comprises a block FFT (Fast Fourier Transform) 76 for transforming the signal into the frequency domain. A pre-equalization block 94 operates on the signal in the frequency domain to perform an interference whitening process. In other words, the pre-equalization block makes the spectrum of the signal flat, thereby reducing any spectral peaks. These reductions correspond to reduced interference levels. The pre-equalized signal is provided to an IFFT (Inverse Fast Fourier Transform) and overlap adding unit 95 for transforming the signal back into the time domain. The so interference whitened signal is then provided to the digital receiver 12. The FDPE is also sometimes classified as an IS (interference suppression) technique.

There are a number of advantages associated with this structure. The FDPE structure gives significant IS gains. It is, however, not clear today if the gains are as large as those achieved with the G-rake+ structure. The FDPE structure achieves IS for all users simultaneously, thereby reducing the computational complexity as compared e.g. to the G-rake+ structure that performs processing individually for all users. Processing blocks are inserted in an uplink receiver structure that is already in place, thereby reducing development costs. The fast Fourier transform (FFT) accelerator hardware developed for LTE can be reused, thereby creating further synergies for new HW of the RBS.

The FDPE algorithm performs interference whitening in the frequency domain. To explain this in detail, the signal models of (B1) and (B2) can be used again. It is well known that the filter that minimizes the mean square error (the MMSE solution) is given by:

$$W_{MMSE}(m) = \left(\hat{R}_d(m)\right)^{-1}\hat{H}(m) = \quad (B5)$$

$$\left(\begin{bmatrix} R_{0,0}(m) & R_{0,1}(m) & \cdots & R_{0,N_r-1}(m) \\ R_{1,0}(m) & R_{1,1}(m) & & \\ \vdots & & \ddots & \\ R_{N_r-1,0}(m) & & & R_{N_r-1,N_r-1}(m) \end{bmatrix}\right)^{-1} \begin{bmatrix} \hat{H}_0(m) \\ \hat{H}_1(m) \\ \vdots \\ \hat{H}_{N_r-1}(m) \end{bmatrix}$$

where $\hat{R}_d(m)$ is an estimate of the covariance matrix of V(m). Note that this estimate can e.g. obtained as an average over N different data blocks:

$$\hat{R}_d(m) = \frac{1}{N}\sum_{k=0}^{N-1} V_k(m)V_k^H(m). \quad (B6)$$

Using a Cholesky decomposition, the covariance matrix between the antenna elements can be factored as:

$$L(m)\cdot L^H(m) = \hat{R}_d(m). \quad (B7)$$

The idea behind FDPE is to exploit this factorization and write:

$$W_{MMSE}(m) = (L^H(m))^{-1}((L(m))^{-1}\hat{H}(m)) = W_{pre}(m)((L(m))^{-1}\hat{H}(m)), \quad (B8)$$

so that the desired signal in the frequency domain becomes MMSE pre-equalized in the frequency domain, i.e. given by:

$$Z_{pre}(m) = W_{pre}(m)V(m). \quad (B9)$$

This is a user independent processing, which is the same for all users. Hence the wideband received signal is transformed to the frequency domain and the covariance matrix is computed and Cholesky factored, after which (B9) is computed. The signal is then transformed back to the time domain where it is further processed for each user. Note that the channels experienced by the RAKE receivers in this processing are obtained from the second factor of (B8). The FFT and IFFT blocks have low computational complexity and are preferably implemented in HW.

APPENDIX C

FDE Processing

The Signal after FDE

Using (B2) and (B4) results in:

$$Z_{FDE}(m) = W(m)H(m)Z(m) + W(m)I(m) + W(m)N^{thermal}(m). \quad (C1)$$

Here $Z_{FDE}(m)$ denotes the pre-equalized wideband signal in the frequency domain, W(m) denotes the wideband MMSE equalizing filter in the frequency domain, H(m) denotes the wideband net channel response in the frequency domain, Z(m) denotes the wideband transmitted signal in the frequency domain, I(m) denotes the wideband neighbor cell interference in the frequency domain and $N^{thermal}(m)$ denotes the wideband thermal noise floor signal in the frequency domain. All signals are vector valued. The equation (C1) is readily transformed to the time domain with an inverse discrete Fourier transformation, rendering:

$$z_{FDE}(t) = (wh)(t)*z(t) + w(t)*i(t) + w(t)*n^{thermal}(t), \quad (C2)$$

where the star denotes (multi-dimensional) convolution, $z_{FDE}(t)$ denotes the equalized wideband signal in the time domain, w(t) denotes the wideband finite impulse response of the equalizing filter in the time domain, h(t) denotes the wideband finite impulse response net channel response in the time domain, (wh)(t) is the combined filter, z(t) denotes the wideband transmitted signal in the time domain, i(t) denotes the wideband neighbor cell interference in the time domain and $n^{thermal}(t)$ denotes the wideband thermal noise floor signal in the time domain.

Measuring Stability Related Load after FDE

Load Definition

To obtain a measure of the load after the FDE interference whitening, the RoT after this step is first considered. The RoT measure after FDE processing is given by:

$$RoT^{FDE}(t) = \frac{z_{FDE}^H(t) z_{FDE}(t)}{E[(w(t)*n^{thermal}(t))^H (w(t)*n^{thermal}(t))]} \quad (C3)$$

Note that this equation is valid for a specific user. This follows since the equalizing filter applied is computed from the channel model of a specific user. To simplify the notation, the user is not indicated in (C3).

In order to address the stability related load the neighbor cell interference, as seen after the FDE processing, needs to be subtracted from the numerator. This follows since the neighbor cell interference does not affect the stability of the own cell since the neighbor cell interference is not controlled by said first cell, i.e.:

$$NR^{FDE}(t) = \frac{z_{FDE}^H(t) z_{FDE}(t) - \hat{I}_{FDE}^{neighbor}(t)}{E[(w(t)*n^{thermal}(t))^H (w(t)*n^{thermal}(t))]}, \quad (C4)$$

where $\hat{I}_{FDE}^{neighbor}(t)$ is the neighbor cell interference, again experienced by a specific user.

Computation of the First Part of the Numerator of (C4)

The first part of the numerator of (C4) is straightforward to compute. Noting that the time scale for the RoT measurement in WCDMA is normally a transmission time interval (TTI), it follows that the first part of the numerator of (C4) can be computed e.g. by an average of time samples over the TTI of interest (typically 2 ms or 10 ms).

Neighbor Cell Interference Estimation

In order to come up with an estimate of the neighbor cell interference after FDE processing ($\hat{I}_{FDE}^{neighbor}$), two simplifying assumptions are necessary. A first one is that the own cell interference dominates over the neighbor cell interference. This assumption is surely not always true. However, it is when the own cell interference dominates that stability of the own cell is most at stake. Hence, the case with dominating neighbor cell interference is less relevant from a stability point of view. Furthermore, the noise rise measure (C4) is not going to be used alone, the RoT measure (C3) is normally used in parallel, capturing the case of dominating neighbor cell interference. A second assumption is that the neighbor cell interference can be treated as generated by a white noise process.

Using these assumptions the neighbor cell interference can be treated as the thermal noise power floor, resulting in:

$$\hat{I}_{FDE}^{neighbor}(t) = E\left[(w(t)*i^{neighbor}(t))^H (w(t)*i^{neighbor}(t))\right] = \quad (C5)$$

$$E\left[\sum_{l_1=0}^{L-1}(i^{neighbor}(t-l_1))^H w^H(l_1) \sum_{l_2=0}^{L-1} w(l_2) i^{neighbor}(t-l_2)\right] =$$

$$E\left[\left(\sum_{l_1=0}^{L-1}\sum_{l_2=0}^{L-1}(i^{neighbor}(t-l_1))^H w^H(l_1) w(l_2) i^{neighbor}(t-l_2)\right)\right] =$$

$$E\left[\sum_{l_1=0}^{L-1}\sum_{l_2=0}^{L-1} w^H(l_1) w_e(l_2) (i^{neigbor}(t-l_1))^H i^{neighbor}(t-l_2)\right] =$$

$$\sum_{l_1=0}^{L-1}\sum_{l_2=0}^{L-1} w^H(l_1) w(l_2) E[(i^{neighbor}(t-l_1))^H i^{neighbor}(t-l_2)] \sum_{l_1=0}^{L-1}\sum_{l_2=0}^{L-1} w^H(l_1) w_e(l_2) \delta_{l_1,l_2} \hat{I}^{neighbor}(t) =$$

$$\sum_{l=0}^{L-1} w^H(l) w(l) \hat{I}^{neighbor}(t).$$

Here $\hat{I}^{neighbor}(t)$ is the neighbor cell interference power as estimated before FDE processing, i.e. at the same signal point as where $\hat{N}$ is estimated. Note that normally the neighbor cell interference is lower than the own cell interference, therefore the approximations associated with the neighbor cell interference have less impact on the final result than what the corresponding assumptions on the own cell interference would have.

This means that the neighbor cell interference may be estimated before FDE processing followed by a scaling to achieve a neighbor cell interference value after FDE processing.

One set of means that allows for neighbor cell interference estimation before FDE processing has e.g. been defined in [2], where a quantity representing a sum of neighbor cell interference and thermal noise power is obtained. Since the noise power floor is also estimated it follows that an estimate of the neighbor cell interference can be made available before FDE processing. Note that the solution in [2] requires that a RAKE receiver for each user is used as well, in order to obtain a measure of all own cell user powers.

Another set of means that would allows for neighbor cell interference estimation before FDE processing would build on [2], where a quantity representing a sum of neighbor cell interference and thermal noise power is obtained. However, rather than using the measured powers before FDE processing in a standard RAKE receiver to achieve the estimation goal, the sum of the computed load factors for the own cell channels would be used. Since the noise power is also estimated it follows that an estimate of the neighbor cell interference can be made available before FDE processing. This approach has the advantage that no prior RAKE receiver processing would be needed, rather the neighbor cell interference estimation would draw on information from other parts of the load estimator.

In detail, this approach would start with the total load factor for the own cell, then use (A5) to solve for the C/I from which the power S of the own cell can be computed from the measured RTWP a using the relation:

$$(C/I) = \frac{S}{RTWP - S} \quad (C6)$$

Computation of the Denominator of (C4)

The computation of the denominator of (C4) requires an evaluation of the expectation of that expression. This can be done assuming the thermal noise to be white and stationary, which is a standard assumption. Note that the evolution here therefore is performed over the time interval where the equalization filter remains constant. It then follows that:

$$E\left[(w(t)*n^{thermal}(t))^H(w(t)*n^{thermal}(t))\right] = \quad (C7)$$

$$E\left[\sum_{l_1=0}^{L-1}(n^{thermal}(t-l_1))^H w^H(l_1)\sum_{l_2=0}^{L-1}w(l_2)n^{thermal}(t-l_2)\right] =$$

$$E\left[\left(\sum_{l_1=0}^{L-1}\sum_{l_2=0}^{L-1}(n^{thermal}(t-l_1))^H w^H(l_1)w(l_2)n^{thermal}(t-l_2)\right)\right] =$$

$$E\left[\sum_{l_1=0}^{L-1}\sum_{l_2=0}^{L-1}w^H(l_1)w_e(l_2)(n^{thermal}(t-l_1))^H n^{thermal}(t-l_2)\right] =$$

$$\sum_{l_1=0}^{L-1}\sum_{l_2=0}^{L-1}w^H(l_1)w(l_2)E[(n^{thermal}(t-l_1))^H n^{thermal}(t-l_2)]$$

$$= \sum_{l_1=0}^{L-1}\sum_{l_2=0}^{L-1}w^H(l_1)w_e(l_2)\delta_{l_1,l_2}\sum_{a=1}^{A}\hat{N}_a^{thermal} =$$

$$\left(\sum_{l=0}^{L-1}w^H(l)w(l)\right)\left(\sum_{a=1}^{A}\hat{N}_a^{thermal}\right).$$

In (C7) $\hat{N}_a^{thermal}$ denotes the estimated thermal noise floor of antenna branch a, before pre-equalization. This means that prior art noise floor estimation algorithms of [1], [2] and [4] can be re-used. One algorithm is needed for each antenna branch.

Load Estimate

Combining (C4), (C5) and (C7) results in $$NR^{FDE}(t) = \frac{z_{FDE}^H(t)z_{FDE}(t) - \left(\sum_{l=0}^{L-1}w^H(l)w(l)\right)\hat{I}^{neighbor}(t)}{\left(\sum_{l=0}^{L-1}w^H(l)w(l)\right)\left(\sum_{a=1}^{A}\hat{N}_a^{thermal}\right)} \quad (C8)$$

$$= \frac{z_{FDE}^H(t)z_{FDE}(t)}{\left(\sum_{l=0}^{L-1}w^H(l)w(l)\right)\left(\sum_{a=1}^{A}\hat{N}_a^{thermal}\right)} - \frac{\hat{I}^{neighbor}(t)}{\left(\sum_{a=1}^{A}\hat{N}_a^{thermal}\right)}.$$

The quantities above should be computed as averages or estimates over a time interval where the equalizing filter of the FDE remains constant. The result is intuitive. Since the total received wideband power is summed over all antenna branches, so is the thermal noise power floor. The RoT after FDE is also scaled with the power of the equalizing filter.

Combination of Users

The above discussion has focused on a single user. However, what is interesting is a load measure for the complete uplink. Since it is likely that it is the user that experiences the highest load that limits the uplink, an approach is followed where the uplink load relevant for stability is defined to be:

$$NR = \max_{u} NR_u^{FDE}, \quad (C9)$$

where $NR_u^{FDE}$ is the noise rise of user u.

APPENDIX D

FDPE Processing
The Signal after FDPE
Using (B2) and (B9) results in:

$$Z_{pre}(m) = W_{pre}(m)H(m)Z(m) + W_{pre}(m)I(m) + W_{pre}(m)N^{thermal}(m). \quad (D1)$$

Here $Z_{pre}(m)$ denotes the pre-equalized wideband signal in the frequency domain, $W_{pre}(m)$ denotes the wideband pre-equalizing filter in the frequency domain, H(m) denotes the wideband net channel response in the frequency domain, Z(m) denotes the wideband transmitted signal in the frequency domain, I(m) denotes the wideband neighbor cell interference in the frequency domain and $N^{thermal}(m)$ denotes the wideband thermal noise floor signal in the frequency domain. The equation (D1) is readily transformed to the time domain with an inverse discrete Fourier transformation, rendering:

$$z_{pre}(t) = (w_{pre}h)(t)*z(t) + w_{pre}(t)*w_{pre}(t)*n^{thermal}(t) \quad (D2)$$

where the star denotes (multi-dimensional) convolution, $z_{pre}(t)$ denotes the pre-equalized wideband signal in the time domain, $w_{pre}(t)$ denotes the wideband finite impulse response of the pre-equalizing filter in the time domain, h(t) denotes the wideband finite impulse response net channel response in the time domain, $(w_{pre}h)(t)$ is the combined filter, z(t) denotes the wideband transmitted signal in the time domain, i(t) denotes the wideband neighbor cell interference in the time domain and $n^{thermal}(t)$ denotes the wideband thermal noise floor signal in the time domain. It is important to understand that all signal quantities are here given before the pre-equalization step.

Measuring Stability Related Load after FDPE
Load Definition

To obtain a measure of the load after the FDPE interference whitening, the RoT after this step is first considered. The RoT measure after FDPE processing is given by:

$$RoT^{FDPE}(t) = \frac{z_{pre}^H(t)z_{pre}(t)}{E[(w_{pre}(t)*n^{thermal}(t))^H(w_{pre}(t)*n^{thermal}(t))]}. \quad (D3)$$

In order to address the stability related load the neighbor cell interference, as seen after the FDPE processing, needs to be subtracted from the numerator. This follows since the neighbor cell interference does not affect the stability of the own cell since the neighbor cell interference is not controlled by said first cell, i.e.:

$$NR^{FDPE}(t) = \frac{z_{pre}^H(t)z_{pre}(t) - \hat{I}_{pre}^{neighbor}(t)}{E[(w_{pre}(t)*n^{thermal}(t))^H(w_{pre}(t)*n^{thermal}(t))]}, \quad (D4)$$

where $\hat{I}_{pre}^{neighbor}(t)$ is the neighbor cell interference as seen after FDPE processing.

Computation of the First Part of the Numerator of (D4)

The first part of the numerator of (D4) is straightforward to compute. Noting that the time scale for the RoT measurement in WCDMA is normally a transmission time interval (TTI), it follows that the first part of the numerator of (D4) can be computed e.g. by an average of time samples over the TTI of interest (typically 2 ms or 10 ms).

Neighbor Cell Interference Estimation

In order to come up with an estimate of the neighbor cell interference after FDPE processing ($\hat{I}_{pre}^{neighbor}$), two simplifying assumptions are necessary. A first one is that the own cell interference dominates over the neighbor cell interference. This assumption is surely not always true. However, it is when the own cell interference dominates that stability of the own cell is most at stake. Hence, the case with dominating neighbor cell interference is less relevant from a stability point of view. Furthermore, the noise rise measure (D4) is not going to be used alone, the RoT measure (D3) is normally used in parallel, capturing the case of dominating neighbor cell interference. The other assumption is that the neighbor cell interference can be treated as generated by a white noise process.

Using these assumptions the neighbor cell interference can be treated as the thermal noise power floor, resulting in:

$$\hat{I}_{pre}^{neighbor}(t) = E\left[(w_{pre}(t) * i^{neighbor}(t))^H (w_{pre}(t) * i^{neighbor}(t))\right] = \quad (D5)$$

$$E\left[\sum_{l_1=0}^{L-1}(i^{neighbor}(t-l_1))^H w_{pre}^H(l_1)\sum_{l_2=0}^{L-1} w_{pre}(l_2)i^{neighbor}(t-l_2)\right] =$$

$$E\left[\sum_{l_1=0}^{L-1}\sum_{l_2=0}^{L-1}(i^{neighbor}(t-l_1))^H w_{pre}^H(l_1)w_{pre}(l_2)i^{neighbor}(t-l_2)\right] =$$

$$E\left[\sum_{l_1=0}^{L-1}\sum_{l_2=0}^{L-1} w_{pre}^H(l_1)w_{pre}(l_2)(i^{neighbor}(t-l_1))^H i^{neighbor}(t-l_2)\right] =$$

$$\sum_{l_1=0}^{L-1}\sum_{l_2=0}^{L-1} w_{pre}^H(l_1)w_{pre}(l_2)E[(i^{neighbor}(t-l_1))^H i^{neighbor}(t-l_2)] =$$

$$\sum_{l_1=0}^{L-1}\sum_{l_2=0}^{L-1} w_{pre}^H(l_1)w_{pre}(l_2)\delta_{l_1,l_2}\hat{I}^{neighbor}(t) =$$

$$\sum_{l=0}^{L-1} w_{pre}^H(l)w_{pre}(l)\hat{I}^{neighbor}(t)$$

Here $\hat{I}^{neighbor}(t)$ is the neighbor cell interference power as estimated before FDPE processing, i.e. at the same signal point as where $\hat{N}$ is estimated. Note that normally the neighbor cell interference is lower than the own cell interference, therefore the approximations associated with the neighbor cell interference have less impact on the final result than what the corresponding assumptions on the own cell interference would have.

This means that the neighbor cell interference may be estimated before FDPE processing followed by a scaling to achieve a neighbor cell interference value after FDPE processing.

One set of means that allows for neighbor cell interference estimation before FDPE processing has e.g. been defined in [2], where a quantity representing a sum of neighbor cell interference and thermal noise power is obtained. Since the noise power floor is also estimated it follows that an estimate of the neighbor cell interference can be made available before FDPE processing. Note that the solution in [2] requires that a RAKE receiver for each user is used as well, in order to obtain a measure of all own cell user powers.

Another set of means that would allows for neighbor cell interference estimation before FDPE processing would build on [2], where a quantity representing a sum of neighbor cell interference and thermal noise power is obtained. However, rather than using the measured powers before FDPE processing in a standard RAKE receiver to achieve the estimation goal, the sum of the computed load factors for the own cell channels would be used. Since the noise power is also estimated it follows that an estimate of the neighbor cell interference can be made available before FDPE processing. This approach has the advantage that no prior RAKE receiver processing would be needed, rather the neighbor cell interference estimation would draw on information from other parts of the load estimator.

In detail, this approach would start with the total load factor for the own cell, then use (A5) to solve for the C/I from which the power S of the own cell can be computed as in (C6).

Computation of the Denominator of (D4)

The computation of the denominator of (D4) requires an evaluation of the expectation of that expression. This can be done assuming the thermal noise to be white and stationary, which is a standard assumption. Note that the evolution here therefore is performed over the time interval where the equalization filter remains constant. It then follows that:

$$E\left[(w_{pre}(t) * n^{thermal}(t))^H (w_{pre}(t) * n^{thermal}(t))\right] = \quad (D6)$$

$$E\left[\sum_{l_1=0}^{L-1}(n^{thermal}(t-l_1))^H w_{pre}^H(l_1)\sum_{l_2=0}^{L-1} w_{pre}(l_2)n^{thermal}(t-l_2)\right] =$$

$$E\left[\left(\sum_{l_1=0}^{L-1}\sum_{l_2=0}^{L-1}(n^{thermal}(t-l_1))^H w_{pre}^H(l_1)w_{pre}(l_2)n^{thermal}(t-l_2)\right)\right] =$$

$$E\left[\sum_{l_1=0}^{L-1}\sum_{l_2=0}^{L-1} w_{pre}^H(l_1)w_{pre}(l_2)(n^{thermal}(t-l_1))^H n^{thermal}(t-l_2)\right] =$$

$$\sum_{l_1=0}^{L-1}\sum_{l_2=0}^{L-1} w_{pre}^H(l_1)w_{pre}(l_2)E[(n^{thermal}(t-l_1))^H n^{thermal}(t-l_2)]$$

$$\sum_{l_1=0}^{L-1}\sum_{l_2=0}^{L-1} w_{pre}^H(l_1)w_{pre}(l_2)\delta_{l_1,l_2}\sum_{a=1}^{A}\hat{N}_a^{thermal} =$$

$$\left(\sum_{l=0}^{L-1} w_{pre}^H(l)w_{pre}(l)\right)\left(\sum_{a=1}^{A}\hat{N}_a^{thermal}\right).$$

In (D6) $\hat{N}_a^{thermal}$ denotes the estimated thermal noise floor of antenna branch a, before pre-equalization. This means that prior art noise floor estimation algorithms of [1], [2] and [4] can be re-used. One algorithm is needed for each antenna branch.

Load Estimate

Combining (D4), (D5) and (D6) results in:

$$NR^{FDPE}(t) = \frac{z_{pre}^H(t)z_{pre}(t) - \left(\sum_{l=0}^{L-1} w^H(l)w(l)\right)\hat{I}^{neighbor}(t)}{\left(\sum_{l=0}^{L-1} w_{pre}^H(l)w_{pre}(l)\right)\left(\sum_{a=1}^{A} \hat{N}_a^{thermal}\right)} \quad (D7)$$

$$= \frac{z_{pre}^H(t)z_{pre}(t)}{\left(\sum_{l=0}^{L-1} w_{pre}^H(l)w_{pre}(l)\right)\left(\sum_{a=1}^{A} \hat{N}_a^{thermal}\right)} - \frac{\hat{I}^{neighbor}(t)}{\left(\sum_{a=1}^{A} \hat{N}_a^{thermal}\right)}.$$

The quantities above should be computed as averages or estimates over a time interval where the interference suppressing filter of the FDPE remains constant. The result is intuitive. Since the total received wideband power is summed over all antenna branches, so is the thermal noise power floor. The RoT after FDPE is also scaled with the power of the equalizing filter.

REFERENCES

[1] T. Wigren and P. Hellqvist, "Estimation of uplink WCDMA load in a single RBS", Proc. IEEE VTC-2007 Fall, Baltimore, Md., USA, Oct. 1-3, 2007.
[2] T. Wigren, "Soft uplink load estimation in WCDMA", IEEE Trans Veh. Tech., March, 2009.
[3] T. L. Fulghum, D. A. Cairns, C. Cozzo, Y.- P. E. Wang and G. E. Bottomley, "Adaptive generalized Rake reception in DS-CDMA systems, Submitted to IEEE Trans. Wireless Commun., 2008.
[4] WO2008/039123.
[5] E. Dahlman, S. Parkvall, J. Sköld and P. Beming, "3G Evolution—HSPA and LTE for mobile broadband—section 5.1" 2:nd edition, Academic Press, 2008.

What is claimed is:

1. A method for assisting load scheduling in a wireless communication system, said method comprising:
   computing an estimate of a noise floor measure for received uplink radio signals;
   estimating a neighbor cell interference power;
   performing an interference whitening of said received uplink radio signals based on one of frequency domain equalizing and frequency domain pre-equalizing;
   determining a useful signal power after interference whitening;
   deriving a first user noise floor compensation factor; and
   calculating a noise rise measure based at least on said useful signal power after interference whitening, said noise floor compensation factor, said noise floor measure and said estimated neighbor cell interference power.

2. The method according to claim 1, further comprising scheduling uplink load in said wireless communication system based on said estimated noise rise measure.

3. The method according to claim 1, wherein said noise rise measure is calculated as said useful signal power after interference whitening divided by a product of said noise floor compensation factor and said noise floor measure, and subtracted by a ratio between said estimated neighbor cell interference power and said noise floor measure.

4. The method according to claim 1, wherein said noise floor compensation factor is based on a wideband finite impulse response of an equalizing filter used in said interference whitening.

5. The method according to claim 4, wherein said noise floor compensation factor is calculated as a wideband finite impulse response power.

6. The method according to claim 1, wherein said interference whitening is based on frequency domain equalizing, said interference whitening is performed for said first user, said useful signal power after interference whitening is determined for said first user, said noise floor compensation factor is derived for said first user, and said noise rise measure is calculated for said first user.

7. The method according to claim 6, further comprising:
   repeating said estimating, performing determining, deriving and calculating for a plurality of users; and
   defining a system noise rise measure based on respective said noise rise measure for said plurality of users.

8. The method according to claim 7, wherein said system noise rise measure is defined as a maximum noise rise of said respective noise rise measure for said plurality of users.

9. The method according to claim 1, wherein said interference whitening is based on frequency domain pre-equalizing, said interference whitening is performed in common for all users, said useful signal power after interference whitening is determined as a useful signal power after interference whitening for all users, said noise floor compensation factor is derived as a noise floor compensation factor for all users, and said noise rise measure is calculated as a noise rise measure for all users.

10. The method according to claim 1, further comprising:
    measuring received total wideband power a plurality of times; and
    generating a measure of an own cell power a plurality of times;
    wherein said computing an estimate of a noise floor measure being based on at least a number of said measured received total wideband powers and said generated measures of an own cell power and wherein said estimating a neighbor cell interference power is based on at least a number of said measured received total wideband powers and said generated measures of an own cell power.

11. An arrangement for assisting load scheduling in a wireless communication system, the arrangement comprising:
    a digital receiver;
    an interference whitener connected to said digital receiver;
    said interference whitener being configured to perform one of frequency domain equalizing and frequency domain pre-equalizing of received radio signals; and
    a processor connected to said digital receiver and to an output from said interference whitener;
    said processor being configured to:
      compute an estimate of a noise floor measure for the received radio signals;
      estimate a neighbor cell interference power;
      determine a useful signal power after interference whitening of the received radio signals;
      derive a first user noise floor compensation factor; and
      calculate a noise rise measure based at least on said useful signal power after interference whitening, said noise floor compensation factor, said noise floor measure and said estimated neighbor cell interference power.

12. The arrangement according to claim 11, further comprising a load scheduler, connected to said processor, said load scheduler being configured to schedule uplink load in said wireless communication system based on said estimated noise rise measure.

13. The arrangement according to claim 11, wherein said noise rise measure is calculated as said useful signal power after interference whitening divided by a product of said noise floor compensation factor and said noise floor measure, and subtracted by a ratio between said estimated neighbor cell interference power and said noise floor measure.

14. The arrangement according to claim 11, wherein said noise floor compensation factor is based on a wideband finite impulse response of an equalizing filter used in said interference whitening.

15. The arrangement according to claim 14, wherein said noise floor compensation factor is calculated as a wideband finite impulse response power.

16. The arrangement according to claim 11, wherein said interference whitening is based on frequency domain equalizing, said interference whitening is performed for said first user, said useful signal power after interference whitening is determined for said first user, said noise floor compensation factor is derived for said first user, and said noise rise measure is calculated for said first user.

17. The arrangement according to claim 16, wherein said processor is further configured to repeat said estimating, performing determining, deriving and calculating for a plurality of users and to define a system noise rise measure based on respective said noise rise measure for said plurality of users.

18. The arrangement according to claim 17, wherein said system noise rise measure is defined as a maximum noise rise of said respective noise rise measure for said plurality of users.

19. The arrangement according to claim 11, wherein said interference whitening is based on frequency domain pre-equalizing, said interference whitening is performed in common for all users, said useful signal power after interference whitening is determined as a useful signal power after interference whitening for all users, said noise floor compensation factor is derived as a noise floor compensation factor for all users, and said noise rise measure is calculated as a noise rise measure for all user.

20. The arrangement according to claim 19, wherein said processor is further configured to measure received total wideband power a plurality of times and to generate a measure of an own cell power a plurality of times; wherein said computing of an estimate of a noise floor measure is based on at least a number of said measured received total wideband powers and said generated measures of an own cell power; and wherein said estimating of a neighbor cell interference power is based on at least a number of said measured received total wideband powers and said generated measures of an own cell power.

21. A base station of a wireless communication system comprising an arrangement for assisting load scheduling, said arrangement for assisting load scheduling in turn comprising:
    a digital receiver;
    an interference whitener connected to said digital receiver;
    said interference whitener being configured to perform one of frequency domain equalizing and frequency domain pre-equalizing on received radio signals; and
    a processor connected to said digital receiver and to an output from said interference whitener, said processor being configured to:
    compute an estimate of a noise floor measure for the received radio signals;
    estimate a neighbor cell interference power;
    determine a useful signal power after interference whitening of the received radio signals;
    derive a first user noise floor compensation factor; and
    calculate a noise rise measure based at least on said useful signal power after interference whitening, said noise floor compensation factor, said noise floor measure and said estimated neighbor cell interference power.

* * * * *

UNITED STATES PATENT AND TRADEMARK OFFICE
CERTIFICATE OF CORRECTION

PATENT NO. : 8,670,344 B2  
APPLICATION NO. : 13/306593  
DATED : March 11, 2014  
INVENTOR(S) : Wigren Page 1 of 2

It is certified that error appears in the above-identified patent and that said Letters Patent is hereby corrected as shown below:

In the Specification

In Column 9, Line 36, delete "148." and insert -- 48. --, therefor.

In Column 14, Lines 27-28, delete "interference." and insert -- interference --, therefor.

In Column 17, Line 65, delete " $\tilde{I}_{FDE}^{neighbor}(t) = E\left[(w(t)*\tilde{i}^{neighbor}(t))^H (w(t)*\tilde{i}^{neighbor}(t))\right] =$ " and insert -- $\tilde{I}_{FDE}^{neighbor}(t) = E\left[(w(t)*\tilde{i}^{neighbor}(t))^H (w(t)*\tilde{i}^{neighbor}(t))\right] =$ --, therefor.

In Column 18, Lines 10-12, delete " $E\left[\sum_{l_1=0}^{L-1}\sum_{l_2=0}^{L-1} w^H(l_1)w_e(l_2)(\tilde{i}^{neighbor}(t-l_1))^H \tilde{i}^{neighbor}(t-l_2)\right] =$ " and insert -- $E\left[\sum_{l_1=0}^{L-1}\sum_{l_2=0}^{L-1} w^H(l_1)w_e(l_2)(\tilde{i}^{neighbor}(t-l_1))^H \tilde{i}^{neighbor}(t-l_2)\right] =$ --, therefor.

In Column 20, Line 30, in Equation (D2), delete " $z_{pre}(t)=(w_{pre}h)(t)*z(t)+w_{pre}(t)*w_{pre}(t)*n^{thermal}(t)$ " and insert -- $z_{pre}(t) = (w_{pre}h)(t)*z(t) + w_{pre}(t)*i(t) + w_{pre}(t)*n^{thermal}(t)$ --, therefor.

In Column 20, Lines 50-52, in Equation (D3), delete " $RoT^{FDPE}(t) = \dfrac{z_{pre}^H(t)z_{pre}(t)}{E[(w_{pre}(t)*n^{thermal}(t))^H (w_{pre}(t)*n^{thermal}(t))]}$ " and insert Signed and Sealed this  
Second Day of September, 2014

Michelle K. Lee  
*Deputy Director of the United States Patent and Trademark Office*

CERTIFICATE OF CORRECTION (continued)
U.S. Pat. No. 8,670,344 B2

$$RoT^{FDPE}(t) = \frac{z_{pre}^H(t)z_{pre}(t)}{E[(w_{pre}(t) * n^{thermal}(t))^H (w_{pre}(t) * n^{thermal}(t))]},$$

--, therefor.

In Column 21, Lines 27-28, delete " $E\left[(w_{pre}(t) * i^{neighnor}(t))^H (w_{pre}(t) * i^{neighbor}(t))\right] =$ " and insert -- $E\left[(w_{pre}(t) * i^{neighbor}(t))^H (w_{pre}(t) * i^{neighbor}(t))\right] =$ --, therefor.

In Column 21, Lines 37-39, delete " $E\left[\sum_{l_1=0}^{L-1}\sum_{l_2=0}^{L-1} w_{pre}^H(l_1)w_{pre}(l_2)(i^{neighbor}(t-l_1))^H i^{neighbor}(t-l_2)\right] =$ " and insert -- $E\left[\sum_{l_1=0}^{L-1}\sum_{l_2=0}^{L-1} w_{pre}^H(l_1)w_{pre}(l_2)(i^{neighbor}(t-l_1))^H i^{neighbor}(t-l_2)\right] =$ --, therefor.